US008126200B2

(12) United States Patent
Rhoads

(10) Patent No.: US 8,126,200 B2
(45) Date of Patent: Feb. 28, 2012

(54) METHODS AND SYSTEMS EMPLOYING DIGITAL CONTENT

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 338 days.

(21) Appl. No.: 12/506,854

(22) Filed: Jul. 21, 2009

(65) Prior Publication Data

US 2010/0185306 A1     Jul. 22, 2010

Related U.S. Application Data

(60) Division of application No. 11/746,811, filed on May 10, 2007, now Pat. No. 7,565,294, which is a division of application No. 10/338,032, filed on Jan. 6, 2003, now Pat. No. 7,349,552, which is a division of application No. 09/563,664, filed on May 2, 2000, now Pat. No. 6,505,160, which is a continuation-in-part of application No. 09/476,686, filed on Dec. 30, 1999, now Pat. No. 7,562,392.

(60) Provisional application No. 60/134,782, filed on May 19, 1999.

(51) Int. Cl.
    *G06Q 99/00* (2006.01)
(52) U.S. Cl. .................. 382/100; 705/319; 455/3.06
(58) Field of Classification Search .................. 382/100; 709/217, 219; 705/26.7, 319; 455/3.04, 455/3.06, 414.2
    See application file for complete search history.

(56) References Cited

U.S. PATENT DOCUMENTS

| | | | |
|---|---|---|---|
| 4,667,088 A | 5/1987 | Kramer et al. | 235/380 |
| 4,972,471 A | 11/1990 | Gross et al. | 380/3 |
| 5,119,507 A | 6/1992 | Mankovitz | 455/154.1 |
| 5,355,302 A | 10/1994 | Martin et al. | 364/410 |
| 5,436,653 A | 7/1995 | Ellis et al. | 348/2 |
| 5,481,294 A | 1/1996 | Thomas et al. | 348/1 |
| 5,502,576 A | 3/1996 | Ramsay et al. | 358/444 |
| 5,534,917 A | 7/1996 | MacDougall | 348/169 |
| 5,581,800 A | 12/1996 | Fardeau et al. | 455/2 |
| 5,584,050 A | 12/1996 | Lyons | 455/67.1 |
| 5,602,566 A | 2/1997 | Motosyuku et al. | 345/123 |
| 5,606,609 A | 2/1997 | Houser et al. | 380/4 |
| 5,613,004 A | 3/1997 | Cooperman et al. | 380/28 |
| 5,640,193 A | 6/1997 | Wellner | 348/7 |
| 5,661,787 A | 8/1997 | Pocock | 379/101.01 |
| 5,677,708 A | 10/1997 | Matthews, III et al. | 345/115 |
| 5,684,873 A | 11/1997 | Tiilikainen | 379/354 |
| 5,687,236 A | 11/1997 | Moskowitz et al. | 380/28 |

(Continued)

FOREIGN PATENT DOCUMENTS

| | | | |
|---|---|---|---|
| WO | WO 9636163 A2 | 11/1996 |
| WO | WO 9743736 A1 | 11/1997 |
| WO | WO 9904568 A1 | 1/1999 |
| WO | WO 0030117 A1 | 5/2000 |

(Continued)

OTHER PUBLICATIONS

Alford, Diamond Rio review article, agn3d.com, Dec. 1, 1998, 3 pp.

(Continued)

*Primary Examiner* — Andrew W Johns

(57) ABSTRACT

A portable device for use with audio or visual content (e.g., an MP3 player-like device, or a camera-enabled device) is equipped with one or more features/capabilities, including: a user interface through which a consumer can instruct that content be delivered to a different consumer's device, the ability to derive identifiers from content and take action(s) based thereon, the ability to count playbacks of content; and/ or the ability to interact with remote web services. A variety of other features and arrangements are also detailed.

20 Claims, 8 Drawing Sheets

U.S. PATENT DOCUMENTS

| | | | | |
|---|---|---|---|---|
| 5,732,216 | A | 3/1998 | Logan et al. | 395/200.33 |
| 5,740,244 | A | 4/1998 | Indeck et al. | 380/4 |
| 5,761,606 | A | 6/1998 | Wolzien | 455/6.2 |
| 5,765,152 | A | 6/1998 | Erickson | 707/9 |
| 5,774,452 | A | 6/1998 | Wolosewicz | 370/212 |
| 5,781,914 | A | 7/1998 | Stork et al. | 707/506 |
| 5,790,172 | A | 8/1998 | Imanaka | 348/7 |
| 5,822,432 | A | 10/1998 | Moskowitz et al. | 380/28 |
| 5,825,353 | A | 10/1998 | Will | 345/184 |
| 5,835,595 | A | 11/1998 | Fraser et al. | 380/25 |
| 5,838,790 | A | 11/1998 | McAuliffe et al. | 380/4 |
| 5,841,978 | A | 11/1998 | Rhoads | 395/200.47 |
| 5,848,413 | A | 12/1998 | Wolff | 707/10 |
| 5,864,868 | A | 1/1999 | Contois | 707/104 |
| 5,870,552 | A | 2/1999 | Dozier et al. | 395/200.49 |
| 5,870,710 | A | 2/1999 | Ozawa et al. | 704/500 |
| 5,903,892 | A | 5/1999 | Hoffert et al. | 707/10 |
| 5,918,223 | A | 6/1999 | Blum et al. | 707/1 |
| 5,923,327 | A | 7/1999 | Smith et al. | 345/341 |
| 5,938,727 | A | 8/1999 | Ikeda | 709/218 |
| 5,943,422 | A | 8/1999 | Van Wie et al. | 380/9 |
| 5,963,916 | A | 10/1999 | Kaplan | 705/26 |
| 5,963,957 | A | 10/1999 | Hoffberg | 707/104 |
| 5,969,283 | A | 10/1999 | Looney et al. | 84/609 |
| 5,978,773 | A | 11/1999 | Hudetz et al. | 705/23 |
| 5,986,200 | A | 11/1999 | Curtin | 84/609 |
| 5,986,690 | A | 11/1999 | Hendricks | 348/7 |
| 5,987,525 | A | 11/1999 | Roberts et al. | 709/248 |
| 5,988,897 | A | 11/1999 | Pierce et al. | 400/61 |
| 5,991,737 | A | 11/1999 | Chen | 705/26 |
| 6,005,501 | A | 12/1999 | Wolosewicz | 341/52 |
| 6,014,569 | A | 1/2000 | Bottum | 455/466 |
| 6,064,764 | A | 5/2000 | Bhaskaran et al. | 382/183 |
| 6,076,734 | A | 6/2000 | Dougherty et al. | 235/462.01 |
| 6,081,830 | A | 6/2000 | Schindler | 709/204 |
| 6,098,106 | A | 8/2000 | Philyaw et al. | 709/238 |
| 6,121,530 | A | 9/2000 | Sonoda | 84/609 |
| 6,122,403 | A | 9/2000 | Rhoads | 382/233 |
| 6,125,172 | A | 9/2000 | August et al. | 379/110.01 |
| 6,128,012 | A | 10/2000 | Seidensticker, Jr. et al. | 345/336 |
| 6,131,162 | A | 10/2000 | Yoshiura et al. | 713/176 |
| 6,147,940 | A | 11/2000 | Yankowski | 369/30 |
| 6,148,407 | A | 11/2000 | Aucsmith | 713/202 |
| 6,151,624 | A | 11/2000 | Teare et al. | 709/217 |
| 6,169,541 | B1 | 1/2001 | Smith | 345/327 |
| 6,169,911 | B1 | 1/2001 | Wagner et al. | 455/566 |
| 6,185,318 | B1 | 2/2001 | Jain et al. | 382/125 |
| 6,188,010 | B1 | 2/2001 | Iwamura | 84/609 |
| 6,199,048 | B1 | 3/2001 | Hudetz et al. | 705/23 |
| 6,199,076 | B1 | 3/2001 | Logan et al. | 707/501 |
| 6,201,554 | B1 | 3/2001 | Lands | 346/169 |
| 6,205,249 | B1 | 3/2001 | Moskowitz | 382/232 |
| 6,212,359 | B1 | 4/2001 | Knox | 455/3.1 |
| 6,219,694 | B1 | 4/2001 | Lazaridis et al. | 709/206 |
| 6,219,793 | B1 | 4/2001 | Li et al. | 713/202 |
| 6,222,807 | B1 | 4/2001 | Min-Jae | 369/58 |
| 6,226,672 | B1 | 5/2001 | DeMartin et al. | 709/219 |
| 6,229,964 | B1 | 5/2001 | Bell | 396/310 |
| 6,233,682 | B1 | 5/2001 | Fritsch | 713/168 |
| 6,240,185 | B1 | 5/2001 | Van Wie et al. | 380/232 |
| 6,243,075 | B1 | 6/2001 | Fishkin et al. | 345/156 |
| 6,243,480 | B1 | 6/2001 | Zhao et al. | 382/100 |
| 6,244,873 | B1 | 6/2001 | Hill et al. | 434/236 |
| 6,247,130 | B1 | 6/2001 | Fritsch | 713/171 |
| 6,249,606 | B1 | 6/2001 | Kiraly et al. | 382/195 |
| 6,253,061 | B1 | 6/2001 | Helferich | 455/31.2 |
| 6,253,237 | B1 | 6/2001 | Story et al. | 709/217 |
| 6,282,362 | B1 | 8/2001 | Murphy et al. | 386/46 |
| 6,297,805 | B1 | 10/2001 | Adler et al. | 345/158 |
| 6,304,523 | B1 | 10/2001 | Jones et al. | 369/30 |
| 6,338,094 | B1 | 1/2002 | Scott et al. | 709/245 |
| 6,345,256 | B1 | 2/2002 | Milsted et al. | 705/1 |
| 6,366,302 | B1 | 4/2002 | Crosby et al. | 345/786 |
| 6,367,019 | B1 | 4/2002 | Ansell et al. | 713/201 |
| 6,369,794 | B1 | 4/2002 | Sakurai et al. | 345/156 |
| 6,377,530 | B1 | 4/2002 | Burrows | 369/59.21 |
| 6,389,055 | B1 | 5/2002 | August et al. | 375/130 |
| 6,389,538 | B1 | 5/2002 | Gruse et al. | 713/194 |
| 6,393,462 | B1 | 5/2002 | Mullen-Schultz | 709/206 |
| 6,411,275 | B1 | 6/2002 | Hedberg | 345/156 |
| 6,418,421 | B1 | 7/2002 | Hurtado et al. | 705/54 |
| 6,425,018 | B1 | 7/2002 | Kaganas et al. | 710/1 |
| 6,425,081 | B1 | 7/2002 | Iwamura | 713/176 |
| 6,438,393 | B1 | 8/2002 | Suuronen | 455/575 |
| 6,442,285 | B2 | 8/2002 | Rhoads et al. | 382/100 |
| 6,453,281 | B1 | 9/2002 | Walters et al. | 704/200 |
| 6,456,725 | B1 | 9/2002 | Cox et al. | 382/100 |
| 6,466,198 | B1 | 10/2002 | Feinstein | 345/158 |
| 6,498,628 | B2 | 12/2002 | Iwamura | 348/734 |
| 6,502,194 | B1 | 12/2002 | Berman et al. | 713/201 |
| 6,505,160 | B1 | 1/2003 | Levy et al. | 704/270 |
| 6,510,234 | B1 | 1/2003 | Cox et al. | 382/100 |
| 6,522,769 | B1 | 2/2003 | Rhoads et al. | 382/100 |
| 6,526,449 | B1 | 2/2003 | Philyaw et al. | 709/238 |
| 6,556,185 | B2 | 4/2003 | Rekimoto | 345/157 |
| 6,567,101 | B1 | 5/2003 | Thomas | 345/649 |
| 6,567,847 | B1 | 5/2003 | Inoue | 709/219 |
| 6,573,883 | B1 | 6/2003 | Bartlett | 345/156 |
| 6,577,746 | B1 | 6/2003 | Evans et al. | 382/100 |
| 6,587,127 | B1 | 7/2003 | Leeke et al. | 345/765 |
| 6,591,365 | B1 | 7/2003 | Cookson | 713/176 |
| 6,597,891 | B2 | 7/2003 | Tantawy et al. | 455/3.05 |
| 6,603,420 | B1 | 8/2003 | Lu | 341/176 |
| 6,605,160 | B2 | 8/2003 | Hoskin | 148/222 |
| 6,611,607 | B1 | 8/2003 | Davis et al. | 382/100 |
| 6,624,824 | B1 | 9/2003 | Tognazzini et al. | 345/684 |
| 6,628,928 | B1 | 9/2003 | Crosby et al. | 455/77 |
| 6,640,306 | B1 | 10/2003 | Tone et al. | 713/201 |
| 6,643,684 | B1 | 11/2003 | Malkin et al. | 709/206 |
| 6,650,761 | B1 | 11/2003 | Rodriguez et al. | 382/100 |
| 6,674,993 | B1 | 1/2004 | Tarbouriech | 455/2.01 |
| 6,681,028 | B2 | 1/2004 | Rodriguez et al. | 382/100 |
| 6,735,311 | B1 | 5/2004 | Rump et al. | 380/231 |
| 6,765,553 | B1 | 7/2004 | Odamura | 345/156 |
| 6,804,376 | B2 | 10/2004 | Rhoads et al. | 382/100 |
| 6,823,225 | B1 | 11/2004 | Sass | 700/94 |
| 6,829,368 | B2 | 12/2004 | Meyer et al. | 382/100 |
| 6,850,252 | B1 | 2/2005 | Hoffberg | 345/716 |
| 6,850,626 | B2 | 2/2005 | Rhoads et al. | 382/100 |
| 6,928,433 | B2 | 8/2005 | Goodman et al. | 707/4 |
| 6,931,451 | B1 | 8/2005 | Logan et al. | 709/231 |
| 6,941,275 | B1 | 9/2005 | Swierczek | 705/26 |
| 6,950,941 | B1 | 9/2005 | Lee et al. | 713/193 |
| 6,952,713 | B1 | 10/2005 | Van Gestel et al. | 709/202 |
| 6,959,288 | B1 | 10/2005 | Medina et al. | 705/51 |
| 6,965,682 | B1 | 11/2005 | Davis et al. | 382/100 |
| 6,990,334 | B1 | 1/2006 | Ito | 455/414.3 |
| 7,017,178 | B1 | 3/2006 | Hendricks et al. | 725/152 |
| 7,035,427 | B2 | 4/2006 | Rhoads | 382/100 |
| 7,051,086 | B2 | 5/2006 | Rhoads et al. | 709/219 |
| 7,055,166 | B1 | 5/2006 | Logan et al. | 725/32 |
| 7,058,697 | B2 | 6/2006 | Rhoads | 709/217 |
| 7,065,342 | B1 | 6/2006 | Rolf | 455/412.1 |
| 7,069,573 | B1 | 6/2006 | Brooks et al. | 725/62 |
| 7,073,187 | B1 | 7/2006 | Hendricks et al. | 725/36 |
| 7,079,807 | B1 | 7/2006 | Daum et al. | 455/3.06 |
| 7,084,903 | B2 | 8/2006 | Narayanaswami et al. | 348/207.99 |
| 7,103,574 | B1 | 9/2006 | Peinado et al. | 705/59 |
| 7,130,608 | B2 | 10/2006 | Hollstrom et al. | 455/403 |
| 7,143,949 | B1 | 12/2006 | Hannigan | 235/462.45 |
| 7,171,018 | B2 | 1/2007 | Rhoads et al. | 382/100 |
| 7,173,651 | B1 | 2/2007 | Knowles | 348/207.1 |
| 7,174,293 | B2 | 2/2007 | Kenyon et al. | 704/231 |
| 7,181,297 | B1 | 2/2007 | Pluvinage et al. | 700/94 |
| 7,185,201 | B2 | 2/2007 | Rhoads et al. | 713/176 |
| 7,190,971 | B1 | 3/2007 | Kawamoto | 455/556.1 |
| 7,206,748 | B1 | 4/2007 | Gruse et al. | 705/1 |
| 7,206,820 | B1 | 4/2007 | Rhoads et al. | 709/127 |
| 7,209,892 | B1 | 4/2007 | Galuten et al. | 705/26 |
| 7,224,995 | B2 | 5/2007 | Rhoads | 455/550.1 |
| 7,233,948 | B1 | 6/2007 | Shamoon et al. | 707/9 |
| 7,251,475 | B2 | 7/2007 | Kawamoto | 455/412.1 |
| 7,263,497 | B1 | 8/2007 | Wiser et al. | 705/26 |
| 7,289,643 | B2 | 10/2007 | Brunk et al. | 382/100 |
| 7,302,574 | B2 | 11/2007 | Conwell et al. | 713/176 |
| 7,333,957 | B2 | 2/2008 | Levy et al. | 705/58 |

| | | | | |
|---|---|---|---|---|
| 7,349,552 | B2 | 3/2008 | Levy et al. | 382/100 |
| 7,377,421 | B2 | 5/2008 | Rhoads | 235/375 |
| 7,415,129 | B2 | 8/2008 | Rhoads | 382/100 |
| 7,426,264 | B1 | 9/2008 | Henderson | 379/142.04 |
| 7,437,430 | B2 | 10/2008 | Rhoads | 709/219 |
| 7,444,353 | B1 | 10/2008 | Chen et al. | 707/104.1 |
| 7,461,136 | B2 | 12/2008 | Rhoads | 709/217 |
| 7,505,605 | B2 | 3/2009 | Rhoads et al. | 382/100 |
| 7,545,951 | B2 | 6/2009 | Davis et al. | 382/100 |
| 7,562,392 | B1 | 7/2009 | Rhoads et al. | 726/26 |
| 7,565,294 | B2 | 7/2009 | Rhoads | 704/270 |
| 7,587,602 | B2 | 9/2009 | Rhoads | 713/176 |
| 7,590,259 | B2 | 9/2009 | Levy et al. | 382/100 |
| 7,593,576 | B2 | 9/2009 | Meyer et al. | 382/190 |
| 7,650,010 | B2 | 1/2010 | Levy et al. | 382/100 |
| 7,693,965 | B2 | 4/2010 | Rhoads | 709/219 |
| 7,711,564 | B2 | 5/2010 | Levy et al. | 704/270 |
| 7,724,919 | B2 | 5/2010 | Rhoads | 382/100 |
| 7,751,596 | B2 | 7/2010 | Rhoads | 382/115 |
| 7,760,902 | B2 | 7/2010 | Rhoads | 382/100 |
| 7,760,905 | B2 | 7/2010 | Rhoads et al. | 382/100 |
| 7,805,500 | B2 | 9/2010 | Rhoads | 709/219 |
| 7,930,546 | B2 | 4/2011 | Rhoads et al. | 713/176 |
| 2001/0001854 | A1 | 5/2001 | Schena et al. | 705/27 |
| 2001/0016836 | A1 | 8/2001 | Boccon-Gibod et al. | 705/51 |
| 2001/0018693 | A1 | 8/2001 | Jain et al. | 707/500 |
| 2001/0028725 | A1 | 10/2001 | Nakagawa et al. | 382/100 |
| 2001/0044744 | A1 | 11/2001 | Rhoads | 705/14 |
| 2001/0053234 | A1 | 12/2001 | Rhoads | 382/100 |
| 2002/0036617 | A1 | 3/2002 | Pryor | 345/156 |
| 2002/0057287 | A1 | 5/2002 | Crow et al. | 345/716 |
| 2002/0071556 | A1 | 6/2002 | Moskowitz et al. | 380/210 |
| 2002/0102966 | A1 | 8/2002 | Lev et al. | 455/412 |
| 2002/0120456 | A1 | 8/2002 | Berg et al. | 704/278 |
| 2002/0174431 | A1 | 11/2002 | Bowman et al. | 725/47 |
| 2003/0011684 | A1 | 1/2003 | Narayanaswami et al. | 348/207.99 |
| 2003/0097338 | A1 | 5/2003 | Mankovich et al. | 705/64 |
| 2003/0167173 | A1 | 9/2003 | Levy et al. | 704/273 |
| 2003/0174861 | A1 | 9/2003 | Levy et al. | 382/100 |
| 2004/0128514 | A1 | 7/2004 | Rhoads | 713/176 |
| 2005/0043018 | A1 | 2/2005 | Kawamoto | 455/414.3 |
| 2005/0058319 | A1 | 3/2005 | Rhoads et al. | 382/100 |
| 2005/0091268 | A1 | 4/2005 | Meyer et al. | 707/103 R |
| 2005/0229107 | A1 | 10/2005 | Hull et al. | 715/764 |
| 2007/0100757 | A1 | 5/2007 | Rhoads | 705/51 |
| 2007/0149116 | A1 | 6/2007 | White et al. | 455/3.06 |
| 2007/0185840 | A1 | 8/2007 | Rhoads | 707/3 |
| 2007/0195987 | A1 | 8/2007 | Rhoads | 382/100 |
| 2007/0250194 | A1 | 10/2007 | Rhoads et al. | 700/94 |
| 2007/0250195 | A1 | 10/2007 | Rhoads et al. | 700/94 |
| 2007/0250716 | A1 | 10/2007 | Brunk et al. | 713/176 |
| 2008/0028223 | A1 | 1/2008 | Rhoads | 713/176 |
| 2008/0133416 | A1 | 6/2008 | Rhoads | 705/51 |
| 2008/0133556 | A1 | 6/2008 | Conwell et al. | 707/100 |
| 2008/0140573 | A1 | 6/2008 | Levy et al. | 705/58 |
| 2008/0319859 | A1 | 12/2008 | Rhoads | 705/14 |
| 2009/0177742 | A1 | 7/2009 | Rhoads et al. | 709/203 |
| 2010/0008586 | A1 | 1/2010 | Meyer et al. | 382/190 |
| 2010/0009722 | A1 | 1/2010 | Levy et al. | 455/566 |
| 2010/0036881 | A1 | 2/2010 | Rhoads et al. | 707/104.1 |
| 2010/0046744 | A1 | 2/2010 | Rhoads et al. | 380/28 |
| 2010/0138012 | A1 | 6/2010 | Rhoads | 700/94 |
| 2010/0150395 | A1 | 6/2010 | Davis et al. | 382/100 |
| 2010/0185306 | A1 | 7/2010 | Rhoads | 700/94 |
| 2010/0322035 | A1 | 12/2010 | Rhoads et al. | 367/118 |

FOREIGN PATENT DOCUMENTS

| | | | |
|---|---|---|---|
| WO | WO 0036605 A1 | 6/2000 | |
| WO | WO 0079709 A1 | 12/2000 | |
| WO | WO 0227431 A2 | 4/2002 | |

OTHER PUBLICATIONS

Apple Newton, article from Wikipedia, printed Feb. 19, 2007, 9 pp.
Blackburn, "A Tool for Content Based Navigation of Music," ACM Multimedia 98, (1998).
Boström, et al."Mobile Audio Distribution, Personal and Ubiquitous Computing," Personal Technologies (1999) 3: 166-172.
Buskirk, Introducing the World's First MP3 player, CNET Reviews, Jan. 21, 2005.
Casio Announces World's Smallest Multimedia Color Palm-Size PC, Feb. 1999 Press Release, 2 pp.
Cox, On the Applications of Multimedia Processing to Telecommunications, Proc. ICIP '97, Oct. 26-29, 1997, 4 pp.
Cox, et al., "Scanning the Technology—On the applications of multimedia processing to communications," Proceedings of the IEEE, vol. 86, No. 5, May 1998, pp. 755-824.
De Vet, et al., "A Personal Digital Assistant as an Advanced Remote Control for Audio/Video Equipment," Proc. Second Workshop on Human Computer Interaction with Mobile Devices, Aug. 13, 1999, Edinburgh, Scotland, pp. 87-91.
DeHerrera, Casio E-100 Review, Pocketpcfaq-dot-com, Apr. 15, 1999.
deMocker, Digital Music Goes Portable, Wired, Sep. 17, 1998, 1 p.
deRoure, "Multiagent System for Content Based Navigation of Music," ACM Multimedia, Oct. 1999, 4 pp.
Foote, "An Overview of Audio Information Retrieval," Multimedia Systems, v.7 n. 1, p. 2-10, Jan. 1999.
Ghias et al, "Query by Humming: Musical Information Retrieval in an Audio Database," ACM Multimedia, pp. 231-236, Nov. 1995.
Irving, Newton Reference—Communications, Jan. 24, 1997.
Jornada 600 Series Product Data Sheet, Hewlett Packard, 1999.
Kageyama et al, "Melody Retrieval with Humming," Proceedings of Int'l Computer Music Conference (ICMC), 1993.
Koch, Audible MobilePlayer review, streettech.com, Jun. 5, 1998, 2 pp.
Macq, et al., "Cryptology for Digital TV Broadcasting," Proc of the IEEE, vol. 83, No. 6, Jun. 1995, pp. 944-957.
Menta, Collecting MP3 Portables—Part 1, Antique Radio Classified, Dec. 2004.
MessagePad 2100—Technical Specifications, Apple Computer, 1997.
Newton Internet Enabler User's Manual, Apple Computer, 1997.
Portable MP3 Player Announced, Diamond Multimedia Systems Press Release, Sep. 15, 1998.
Roy, "Wearable Audio Computer—A Survey of Interaction Techniques," MIT Media Lab, 1997.
SDMI, Portable Device Specification, Part 1, Doc. No. PDWG99070802, Jul. 8, 1999, 35 pp.
Smith, et al, "Music Information Retrieval Using Audio Input." Proc AAAI Spring Symposium on Intelligent Integration and Use of Text, Image, Video and Audio Corpora, pp. 12-16.
Smith, "Some Social Implications of Ubiquitous Wireless Networks," ACM SIGMOBILE Mobile Computing and Communications Review, vol. 4, No. 2, Apr. 2000, pp. 1-10.
Using E-Mail on Your Newton Device, Apple Computer, 1997.
Vincent, "Mobilising the Net," IEE Review, vol. 45, No. 6, Nov. 18, 1999, pp. 241-245.
Wold et al, "Content-Based Classification, Search, and Retrieval of Audio," IEEE Multimedia Magazine, Fall, 1996.
U.S. Appl. No. 09/337,590, filed Jun. 21, 1999, Geoffrey B. Rhoads.
U.S. Appl. No. 09/491,534, filed Jan. 26, 2000, Bruce L. Davis, et al.
U.S. Appl. No. 09/515,826, filed Feb. 29, 2000, Geoffrey B. Rhoads et al.
U.S. Appl. No. 09/574,726, filed May 18, 2000, Geoffrey B. Rhoads.
Prosecution excerpts from U.S. Appl. No. 11/746,804, including all office actions and responses Jul. 20, 2009-Jul. 25, 2011.
Prosecution excerpts from U.S. Appl. No. 11/746,811, including all office actions and responses Mar. 9, 2009-May 29, 2009.
Sony press release, 'Sony Announces New VAIO Notebook Computer,' Sep. 3, 1998, 3 pages.
"Welcome to one of the unofficial websites for the Sony PCG-C1/R sub-notebook computer" Web Archive crawl of farstand web site, Oct. 2, 1999, 5 pages.
Winamp "Winamp Player Overview" web page dated Dec. 3, 1998, archived by Web Archive, 3 pages.
Winamp home web page dated Dec. 12, 1998, archived by Web Archive, 5 pages.
Winamp "New Features" web page dated Dec. 2, 1998, archived by Web Archive, 3 pages.

METHODS AND SYSTEMS EMPLOYING DIGITAL CONTENT

RELATED APPLICATION DATA

This application is a division of application Ser. No. 11/746,811, filed May 10, 2007 (now U.S. Pat. No. 7,565,294), which is a division of application Ser. No. 10/338,032, filed Jan. 6, 2003 (now U.S. Pat. No. 7,349,552), which is a division of application Ser. No. 09/563,664, filed May 2, 2000 (now U.S. Pat. No. 6,505,160), which is a continuation-in-part of application Ser. No. 09/476,686, filed Dec. 30, 1999 (now U.S. Pat. No. 7,562,392), which claims priority to provisional application No. 60/134,782, filed May 19, 1999.

The subject matter of the present application is also related to that disclosed in U.S. Pat. No. 5,862,260, and in application Ser. No. 08/746,613, filed Nov. 12, 1996 (now U.S. Pat. No. 6,122,403); 09/343,104, filed Jun. 29, 1999 (now abandoned in favor of continuing application Ser. No. 10/764,430, published as US20050013462); 60/164,619, filed Nov. 10, 1999; Ser. No. 09/503,881, filed Feb. 14, 2000 (now U.S. Pat. No. 6,614,914); 09/525,865, filed Mar. 15, 2000 (now U.S. Pat. No. 6,611,607); 60/191,778 filed Mar. 24, 2000; Ser. No. 09/547,664, filed Apr. 12, 2000 (now U.S. Pat. No. 7,206,820); and Ser. No. 08/508,083, filed Jul. 27, 1995 (now U.S. Pat. No. 5,841,978). The subject matter of the present application is also related to that disclosed in PCT Application PCT/US96/06618, filed May 7, 1996 (published as WO 96/36163).

The foregoing documents are incorporated herein by reference.

TECHNICAL FIELD

The present disclosure concerns methods and systems employing audio, video, imagery, and/or other media content.

Excerpts Adapted from Application Ser. No. 09/563,664

Now U.S. Pat. No. 6,505,160

Background

Advances in computer and wireless networking, multimedia coding, and higher bandwidth communication links are creating many new ways to distribute and enjoy multimedia content, such as music and movies. Coding formats for audio like MPEG 1 Layer 3 (MP3) have already caused significant changes in music delivery to consumers. Despite the advances in technology, content distributors and broadcasters still need to address how to effectively promote and sell content.

This disclosure describes systems and processes for linking audio and other multimedia data objects with metadata and actions via a communication network, e.g., computer, broadcast, wireless, etc. Media objects are transformed into active, connected objects via identifiers embedded into them or their containers. These identifiers can be embedded by the owner or distributor of the media object, or automatically created from the media object. In the context of a user's playback experience, a decoding process extracts the identifier from a media object and possibly additional context information and forwards it to a server. The server, in turn, maps the identifier to an action, such as returning metadata, redirecting the request to one or more other servers, requesting information from another server to identify the media object, etc. If the identifier has no defined action, the server can respond with an option for the user to buy the link and control the resulting action for all objects with the current identifier. The linking process applies to broadcast objects as well as objects transmitted over networks in streaming and compressed file formats.

Further features will become apparent with reference to the following detailed description and accompanying drawings.

DESCRIPTION

Figure 1:
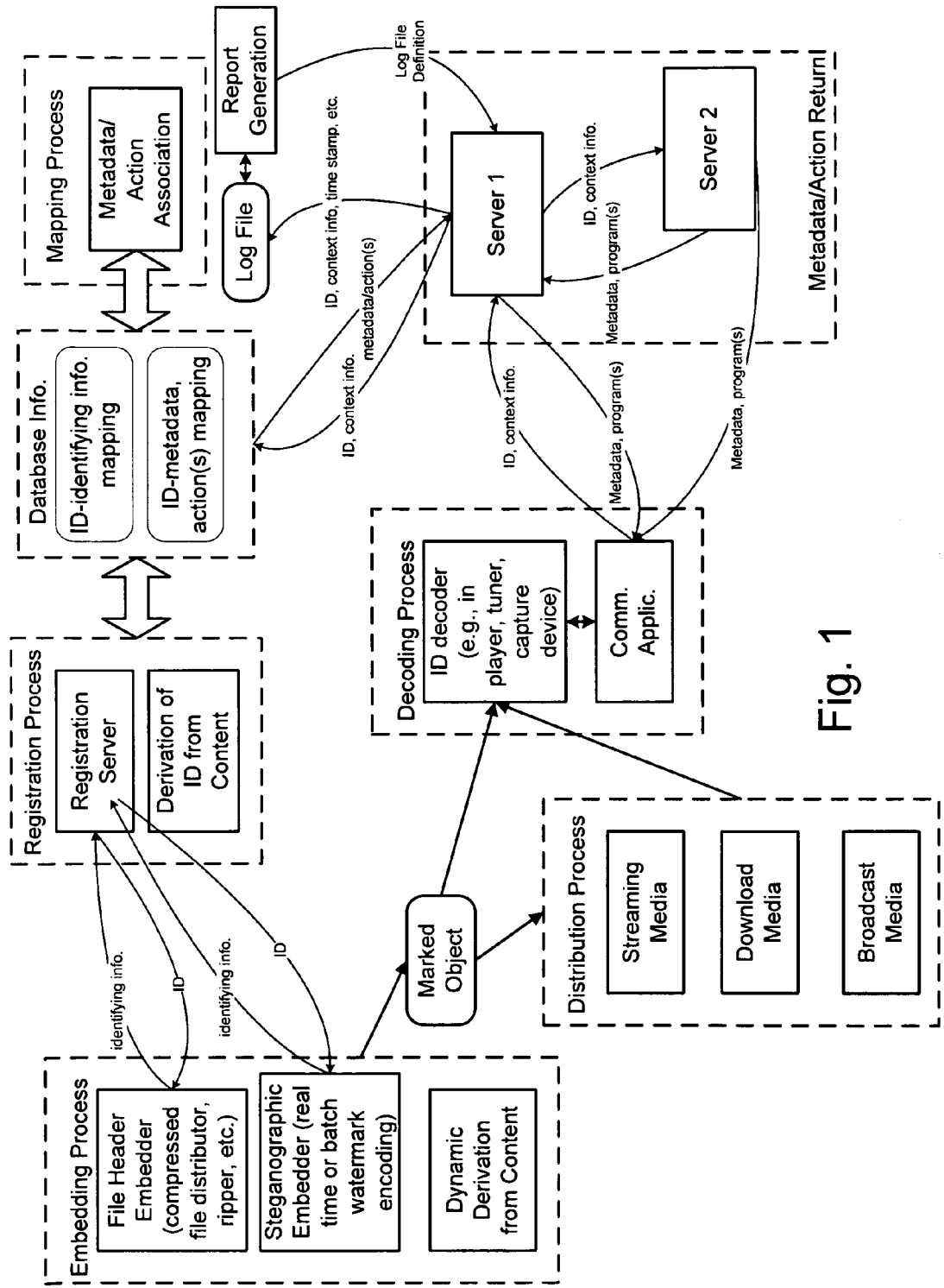
FIG. 1 is a diagram illustrating examples of media object linking processes and systems.

Linking Audio and Other Media Objects Via Identifiers

The following sections describe systems and processes for linking audio and other media objects to metadata and actions via an identifier. For the sake of illustration, the disclosure focuses on a specific media type, namely audio signals (e.g., music, sound tracks of audio visual works, voice recordings, etc.). However, these systems, their components and processes apply to other types of media signals as well, including video, still images, graphical models, etc. As described further below, an identifier attached to an audio signal is used to connect that signal with metadata and/or programmatic or device actions. In the context of this document, the terms "media object" and "audio object" refer to an electronic form of a media signal and audio signal, respectively. The linking of media signals applies to objects that are transmitted over wire networks (such as a computer network), wireless networks (such as a wireless telephone network), and broadcast (AM, FM, digital broadcast, etc.).

There are a number of ways to associate an identifier with an audio object. One way to associate the identifier is to insert it in the form of a numeric or alphanumeric code (e.g., binary or M-ary code) in the electronic file in which the audio is stored. Another way to associate the identifier is to embed it as auxiliary data in the audio signal using stenographic methods, such as digital watermarking or other data hiding techniques. Yet another way is to derive the identifier from the audio signal, the table of contents, the file system structure, or its container (e.g., an electronic file or physical package for data like flash memory, Digital Versatile Disk (DVD), minidisk, or compact disk (CD). The physical media may have identifying characteristics, such as a unique identifier or encoded metadata, or other attributes from which an identifier can be derived (e.g., CD disk wobble).

When the identifier is associated with metadata or actions, it transforms the media object into a "linked" object. The identifier travels with the object through distribution, including in some cases, through physical distribution in packaged media and through electronic distribution (broadcast or network communication). The identifier may travel within the same band as the audio object, such as, a watermark, or via a separate band, such as a file header or footer or separate broadcast band. A decoding device or programmatic process extracts the identifier from the object and uses it to retrieve related data or actions ("metadata"). In the case of an audio object, like a song, the metadata typically includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, recording marketing data about a transaction, etc. The identifier allows a fan of a particular type of music or artist to get more information about the music and to buy more music. From the perspective of the artists and record labels, the identifier provides an additional opportunity to promote their music and sell content, concert tickets, etc.

In addition, in some implementations where identifier linking transactions are monitored, it enables the vendors of music to gather data about electronic transactions triggered by the link. For example, users of information may choose to provide information about themselves when they register their decoding device or software with the system. A user ID or other context information may then be recorded when the identifier is extracted and used to trigger a transaction. Many entities involved in the distribution of media signals can benefit from the linking capability. Artists can link their music to information about themselves and provide electronic buying opportunities for music, concert tickets, clothing, etc. Rights holding organizations can use the link to inform users about itself and licensing opportunities. In some cases, the link may also be used to monitor playing and distribution of copies of the music. Record labels can link their music to information about the artist, the label, electronic buying opportunities, etc. Electronic retailers can increase sales by linking users to opportunities to sample and buy additional music (via download or streaming delivery over a wire or wireless network). Conventional brick and mortar retailers can use linking to provide information about the music and to provide buying opportunities. Radio stations and other broadcasters can use the linking capability to bring users to their web sites, creating advertising revenue, to provide electronic buying opportunities for music, concert tickets, clothing items, etc. These and other forms of linked metadata and actions may be implemented in various combinations in different application scenarios.

Depending on the application, the identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution, location of distribution, etc. may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

System Implementation

FIG. 1 is a diagram of a system configuration of linked media objects. In this configuration, an identifier links audio objects to metadata via an electronic network, such as the Internet, a wireless network, or a broadcast network. As depicted in FIG. 1, an embedding process may be used to encode an identifier in an audio object or its container. In some cases, an embedding process encodes the identifier in the audio file (e.g., a tag in a file header or footer), in the audio signal (a digital watermark), or in the physical packaging. The identifier may also be derived as a function of the audio signal or other information in the file or physical packaging (e.g., track information on a CD). In the case of dynamically derived identifiers, an embedding process is not necessary because the identifier can be derived from the content at decoding time.

In some application scenarios, the embedding process interacts with a registration process to get an identifier. The embedding process provides information about the object (e.g., a title and artist name, an ISRC, name of distributor, etc.). In response, the registration process provides an identifier and stores a database record of the association between identifier and the object or other information used in decoding to identify the object, such as its distributor or broadcaster. The registration process may be used to assign an identifier to an audio object and to distributors or broadcasters of audio objects. The embedding and registration processes may occur before the audio object is distributed to consumers, or sometime thereafter, such as when a user transfers (e.g., "rips") an a media object from one format to another (e.g., a packaged format to an electronic file format such as a compressed file format).

Once registered, an interactive or automated mapping process associates the identifier with data or actions. The registration process creates a database of identifiers and associates the identifiers with corresponding media objects, distributors, broadcasters, etc. The mapping process associates the identifiers with corresponding metadata or actions.

Once associated with an audio object and metadata, the identifier transforms the audio object into a linked object. The identifier remains with the object through distribution, although some embedding processes are more robust than others to intentional or unintentional distortion/removal of the identifier. There a variety of different distribution scenarios. Some examples depicted in FIG. 1 include transferring an audio object over a computer network, streaming the object over a computer network, or broadcasting it (e.g., AM/FM broadcasting, digital broadcasting, broadcasting over wireless carriers, etc.). Whatever the distribution process, a user ultimately receives the linked object in a player, tuner, or capture device.

To activate the linked object, a decoding process extracts the identifier and uses it to access associated data or actions. The decoding process may be implemented as a separate program or device, or integrated into a player, tuner, or some other capture device, such as a listening devices that converts ambient audio waves to an electronic signal and then extracts the identifier from the signal.

In the configuration shown in FIG. 1, the decoding process forwards the extracted identifier to a communication application, which in turn, forwards it in a message to a server. The decoding process or the communication application may add additional context information to the message sent to the to a server. The context information may relate to the user, the user's device, the attributes of the session (time of playback, format of playback, type of distribution (e.g., broadcast or transmitted audio file), etc.) Based on identifier and optional context information, the server determines an associated action to perform, such as re-directing an identifier or context data to another server, returning metadata (including programs, content, etc.), downloading content, logging a transaction record. To find the associated action or actions, the server maps the identifier to actions based on the information established in the mapping process. The server may: 1) look up the data and actions in a local database stored in its memory subsystem; 2) route the identifier to one or more other servers via the network, which in turn look up related actions and data associated with the identifier; or 3) perform some combination of actions 1 and 2.

In the first case, server 1 returns data or actions associated with the identifier. The server may look up related data based on the identifier alone, or based on the identifier and other context information. Context information may be information provided by the user, by the user's computer or device, or by some other process or device. In the second case, the server looks up one or more addresses associated with the identifier and forwards the identifier and/or possibly other context data to secondary servers at these addresses via conventional networking protocols. Again, this context data may include data from the user, the user's computer, some other device or database. For example, server 1 might query a remote database for instructions about how to process an identifier. These instructions may specify data to return to the communication application or to forward to another server, which in turn, looks up associated data and returns it to the communication application. A server may return data that an audio player displays to the user or uses to control rendering of the content. For example, the server can tell the player that the object contains inappropriate content for children. The player or user can make decisions about whether or how to play the material based on this information.

Both the server and the player can adopt a set of rules. The server rules may be used to control what the server returns in response to an identifier and context data. The player rules may be used to control what the player displays to the user or how it renders the content based on data returned from a server.

Either the first server, or a server one or more levels of indirection from the identifier may return data and programmatic actions to a player via the communication application. Each server in these levels of indirection receives a database key, such as an identifier or context information, from the previous server, and uses it to look up corresponding actions. These actions may include returning data or programs to the communication application or to previous servers in the routing path of the message from the communication application. Also, the servers may route requests for information or actions to other servers. The server or servers may return data or perform actions in response to the identifier (or other context data) that do not directly impact the decoding process, or the device in which it operates.

The system depicted in FIG. 1 allows several different interested parties to establish services linked via the identifier. For example, server 1 can be configured to provide generic promotional and/or licensing information associated with an identifier. If the content owner, distributor, retailer, artist or other related party wishes to provide information or services for a connected object, then server 1 may also route the identifier for that object, and possibly context information, the address of the communication application, and instructions, to servers maintained by these entities. These servers, in turn, provide promotional, sales, or licensing information, and electronic buying or licensing opportunities specific to that entity back to the consumer over the network via the communication application.

In the context of a network configuration, Internet protocols may be used to return data to the communication application or to the device or system in which it operates. The communication application may be implemented in a web browser, such as Internet Explorer or Netscape Navigator. Examples of ways of exchanging information between a client player and a server include returning a web page with metadata and program scripts designed to run on the end user's system. The metadata itself may include active links, such as URLs to other network resources, such as a web site or some other network service. The path of the identifier from the decoding process, and the return path from a server to the communication application may include one or more hops through a wire or wireless connection using standard wire and wireless communication protocols like TCP/IP, HTTP, XML, WAP, Bluetooth, etc. In addition, data returned to the user may be routed through one or more servers that may forward the data, and in some cases, augment the data or modify it in some fashion.

Figure 2:
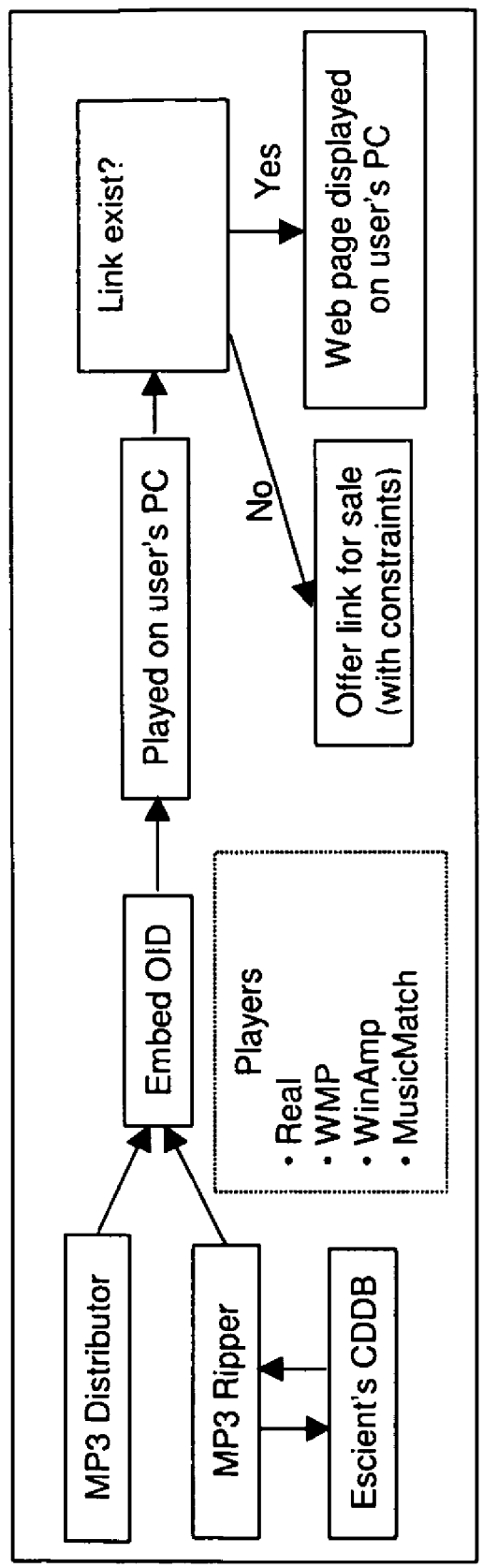
FIG. 2 is a diagram illustrating media object linking applications.

FIG. 2 is a diagram illustrating applications of the system depicted in FIG. 1. In the application scenarios depicted in FIG. 2, an embedding process encodes an object identifier (OID) into an audio file, such as an ID3 tag in the header of an MP3 file or audio frame headers in the MP3 file. FIG. 2 shows two embedding scenarios. The first is an MP3 distributor that embeds OIDs in MP3 files before transmitting them over a network, such as the Internet, typically via a web site interface. The second is a file ripping process where a programmed computer or other device extracts an audio object from packaged media such as a CD and converts it into a coded file format like MP3. In the latter case, the ripping process may extract metadata from the CD, such as the table of contents, and use this metadata as a key to a database (CDDB) to get information about the songs on the CD, such as title, artists, etc. The table of contents or other metadata from a package medium, such as optical or magnetic storage or flash memory, may be hashed into an index to a database entry that stores information about the media signal stored on the medium. The ripping process uses the information returned from the database to identify the audio objects on the packaged media so that they can be associated with an OID. This is an example of identifying information used to associate an OID with an audio object. As part of the coding process, the ripping process inserts the OID in the file header of the MP3 file.

Later, when a user opens or plays the marked MP3 in a player, such as a software player like the real player, Liquid Audio player, Windows Media Player (WMP), WinAmp, MusicMatch, etc., a plug-in software module in the player extracts the OID and forwards it to a server via an Internet connection. The plug-in may establish its own Internet connection, or pass the OID to an Internet Browser, which in turn, establishes a connection (if one is not already present) with the server. As an intermediate step, the plug-in may display a window with user options, such as "learn more about the song", "play the song", or both. The user can then choose to get more information by actuating the first or third options in the user interface window, which cause the plug-in to forward the OID to the server.

The server then returns a web page associated with the OID, or re-directs the OID to another server (e.g., one maintained by the content distributor or owner), which in turn, returns a web page of information about the object and links to related actions (e.g., a link to a licensing server, a link to a server for buying and downloading related music etc.). The licensing server may be programmed to download software players and new music offerings compatible with those players. For instance, the licensing server may provide software for decrypting, decoding, and playing electronically distributed music according to usage rules packaged with the electronically distributed music. In this application scenario, the linking of the MP3 file enables the content owner to market music and products that promote the sale of audio objects in other formats, included formats protected with encryption, watermark copy managements schemes, etc.

In the event that a media object is not linked, the decoding and server processes can be programmed to enable the user to purchase a link for the object. For example in one scenario, the player plug-in displays a graphic for a link information indicating that the link is available after determining that an OID is not in the file. If the user clicks on the graphic, the plug-in displays more information about the procedure for purchasing or renting a link. This information may be provided in conjunction with querying the server and displaying information returned from the server, or alternatively, providing pre-programmed information incorporated into the plug-in. If the user is interested in purchasing the link, he or she can then enter input (e.g., click on a button such as "Get Link") that initiates the process of registering an OID with the object and associating metadata or actions with the OID. The process of registering the OID and associating the OID with metadata or actions may be performed as described in this document. This scenario provides yet another mechanism for transforming content into connected content.

There are many possible variations to the applications scenarios illustrated in FIG. 2. During the file ripping process (or some other embedding process), the embedder may generate a unique ID from the metadata read from the packaged media on which the media object resides. One example of such an ID is the number derived from CD metadata currently used to index information in the CDDB database. This ID may then be embedded in the audio object or its file header/footer. During OID registration, the registration process may inform the embedding process that the OID (and thus, the object for which it was derived) has not been associated with metadata or actions. In this case, the user may be given an opportunity to purchase the link, either at the time of ripping, or in the future, wherever the object travels. In the latter case, the OID in the object is associated with an option to buy the link and customize the data and/or actions associated with that link. Rather than link to promotional information, the OID gives users an option to buy or rent the link and provides them with an opportunity to customize it (e.g., linking it to a custom web site). Once customized, other users that open or play the file will then be able to link to the customized information or actions.

To assert control over the type of customization that users may perform, the registration and mapping processes can place constraints on the types of metadata and actions that users can link to a media object.

In the multimedia content industry, there are typically many rights holders and entities involved in the distribution process. This may present a conflict when linking a media object to one entity. One way to address this problem is have an object link to many different entities. For example, the server could map an OID to many entities and return links to retailers, distributors, record labels and artists. Another way to address it is to encode additional information about the distributor in the OID. For example, the OID includes fields that identify the object and its distributor. If a user activates the link to purchase products, including media objects, then the distributor name is logged with the purchase and that distributor is credited with royalties associated with the transaction. The distributor field may also be used as a key to look up the appropriate action for the OID, such as re-directing the OID to the web server of the entity associated with that OID. In this approach, even if the OID directs a user to a record label's website, the distributor field can be used to credit the distributor with a royalty for the linking transaction.

The entity responsible for maintaining a web site linked via on identifier can make deals with online resources for providing data about a media object such as lyrics, song titles, radio station play lists. The website may link to this information, access it via a database manager, etc.

File Identifiers

One form of identifier is an identifier that is inserted in an audio object file, but in a distinct field from the audio signal itself. Some examples are file headers and footers. This file identifier may be assigned before or after distribution of the audio object to consumers. In addition, it may be derived from the audio signal or other information in the file. For example, an identifier generator may derive a unique or sufficiently unique identifier from a portion of a music signal. A variety of methods for generating a unique numbers based on a unique collection of numbers may be used.

The process of embedding a file identifier may be done at the time of encoding or transcoding a file. For example, the file identifier may be inserted during a ripping process, such as when a device or programmatic process converts a song from a format stored on packaged media, like a CD or DVD, to an electronic, and compressed form, such as MP3 or some other audio codec. As another example, the file identifier may be inserted when a device or programmatic process transcodes an electronic music file from one codec format to another. Yet another example is where a file is taken from a digital or analog uncompressed format, and placed in another format for distribution.

Identifiers Embedded in Audio Signal

Another way to associate an identifier with an audio signal is to embed the identifier in the audio signal using stenographic methods, such as digital watermarking or other data hiding techniques. Many of such techniques have been developed and are described in published articles and patents. Watermarking methods are described in U.S. Pat. No. 6,614,914; other examples of methods for encoding and decoding auxiliary signals into audio signals include U.S. Pat. Nos. 5,862,260, 5,940,135 and 5,945,932. The foregoing patents are incorporated herein by reference.

The stenographic embedding method may be performed in a batch process. Consider a distributor of electronic music via the Internet or some other network, or a broadcaster of music such as a radio station. In each case, the distributor and broadcaster have a collection of audio objects. The embedding process may operate on this collection of objects in a batch process by retrieving an electronic version, encoding an identifier obtained from the registration process, and returning the marked version for later distribution or broadcasting. In some cases, it is desirable to do watermark embedding in an iterative process in a studio environment to encode the watermark with an intensity that achieves desired perceptibility and robustness requirements.

The stenographic embedding method may also be performed at the time of transmission of an electronic file or broadcast of the audio object. In the case of distribution via a network such as the Internet (e.g., streaming or file download), real time embedding enables the embedding process to also embed context information that is specific to the consumer (or the consumer's computer) that has electronically ordered the object. For example, when the user requests a file in a streaming or a compressed file format via the Internet using her browser, the distributor's server can request information (perhaps voluntary) about the user to be associated with the transmitted object. Later, the decoding process or the servers that map the identifier to actions or metadata can use this information to determine the types of information to provide or responsive action to perform.

In the case of broadcasting, real time embedding enables the identifier to be steganographically embedded throughout an electronic version of the audio signal just before, or as part of the broadcasting process.

An object or distributor ID (as well as other identifiers or context information) can be embedded in the payload of a watermark that is also used for copy control. Portion of the watermark can be used to control whether the object can be played, transferred, recorded, etc., while another part can be used to carry identifiers and other metadata for linking functions described in this document. Alternatively, entirely separate watermark encoding and decoding methods may be used for copy control and linking functions.

A watermarking process may be used to encode different watermarks in the various channels of an audio signal. Message information may be embedded in one or more channels, while synchronization or orientation signals used to detect and decode the message information may be encoded in other channels. Also, different messages (e.g., different identifiers) may be encoded in different channels. At decoding time, the different identifiers can trigger different actions or link to different data.

In broadcasting applications, an identifier may be encoded along with the broadcast of the associated media signal by modulating a subcarrier of the main carrier frequency used to transmit the media signal. The subcarrier conveys auxiliary data such as the identifier, while the main carrier conveys the associated media signal To reduce audibility of the auxiliary data (e.g., the identifier(s)) encoded in the sub-carrier, the data can be randomized by applying it to a pseudorandom or random number by some function that may be inverted in the decoding process, e.g., multiplication or exclusive OR functions. One example of sub-carrier encoding and decoding is Active HSDS 97 developed by Seiko Corporation.

Identifiers in Digital Radio Broadcasts

Some forms of digital radio broadcasts support transmission of metadata along with media signals. This metadata can also be used to carry one or more identifiers that are mapped to metadata or actions. The metadata can be encoded at the time of broadcast or prior to broadcasting. Decoding of the identifier may be performed at the digital receiver. In particular, the digital receiver receives the broadcast data, extracts the identifier, and either automatically, or at the user's direction, forwards the identifier to a server to look up the associated metadata or action.

Dynamic Identifier Extraction from Audio Content or Related Data

As noted above, another way to associate an identifier with a corresponding audio signal is to derive the identifier from the signal. This approach has the advantage that the embedding process is unnecessary. Instead, the decoding process can generate the identifier from the audio object. In this case, the decoder computes a fingerprint of the audio signal based on a specified fingerprinting algorithm, The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, SHA1.

As an aside, fingerprinting may also be used to determine whether an audio signal has been watermarked. The fingerprinting application can evaluate a fingerprint for a received object and compare it with one for a watermarked object (or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), then uses a fingerprinting process tailored for that type of file (e.g., a hash of a compressed image or video frame). The dynamic identifier computed by this process may be associated with metadata and/or actions using the processes and systems described in this document.

Excerpts Adapted from application Ser. No. 09/476,686

Now U.S. Pat. No. 7,562,392

Introduction 16 year old Bob struts into the coffee shop down from high school with a couple of buddies, a subtle deep pound in the ambient sound track lets them know they're in the right place. The three of them instinctually pull out of their pockets their audio Birddawgs (a small hand held unit about the size and style of an auto-door-alarm device, or "fob"), and when they see the tiny green light, they smile, high five, and push the big "GoFetch" button in synchrony. That tune will now be waiting for them at home, safely part of their preferred collection and ever-so-thankfully not lost to their collective bad memory (if they even knew the name of the artist and tune title in the first place!).

33 year old Mary is at home listening to the latest batch of holiday tunes being offered up over her 2-decade-long favorite radio station. She's spent many days now half-consciously culling the tunes for that perfect arrangement for the new year's bash that she regrettably agreed to host. 10:40 AM rolls around and some new tune catches her ear, a tune she knows can work well following the jingle-cats rendition of Strawberry Fields. She half jogs over to the stereo and hits the "GoFetch" button. In a few days, she'll sit down at the computer and put together the final sound track for the gala evening ahead, her play list dutifully waiting for her shuffling instructions and desired start time.

49 year old Jack (the financial analyst) is thoroughly bored sitting in the crowded gate D23 at Dulles. Droning 20 feet up and over his head is the airport network station, currently broadcasting the national weather report. As the segue to the business segment approaches, the teaser review mentions that they'll be having a report on today's rally in the bond market and the driving forces behind it. Jack pulls out his Birddawg-enabled Palm Pilot on the off-chance they actually will have a little depth in the reporting. Indeed, as the segment plays and starts discussing the convoluted effects of Greenspan's speech to the Internet-B-Free society, he taps the "GoFetch" button, knowing that once he gets back to his main browsing environment he will be able to follow dozens of links that the airport network has pre-assigned to the segment.

The foregoing and other features and advantages will be more readily apparent from the following detailed description, which proceeds with reference to the accompanying figures.

Brief Description of the Drawings

Figure 3:
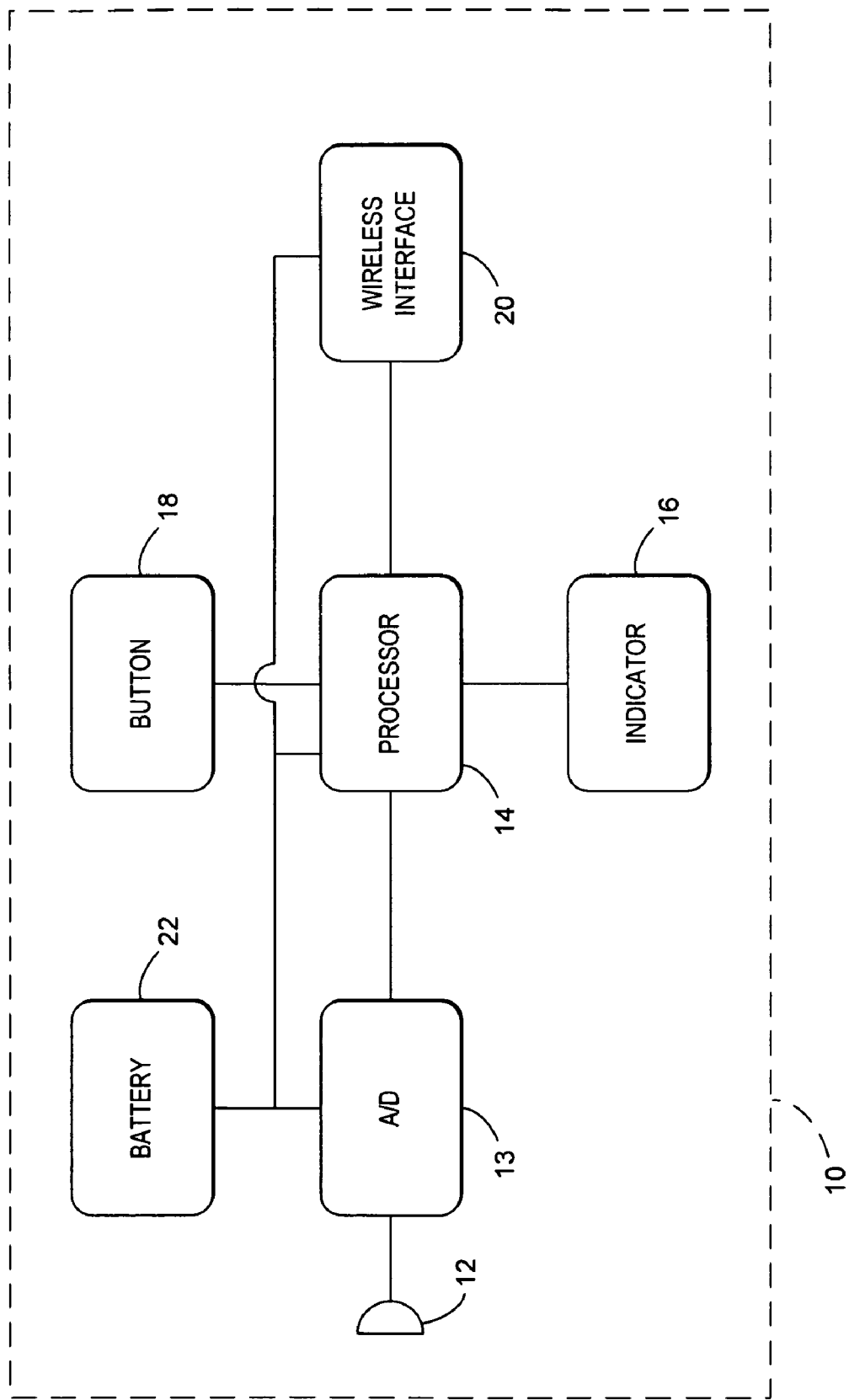
FIGS. 3-9 are identified in subsequent sections of this specification.

FIG. 3 is a block diagram of a device according to one embodiment.

Figure 4:
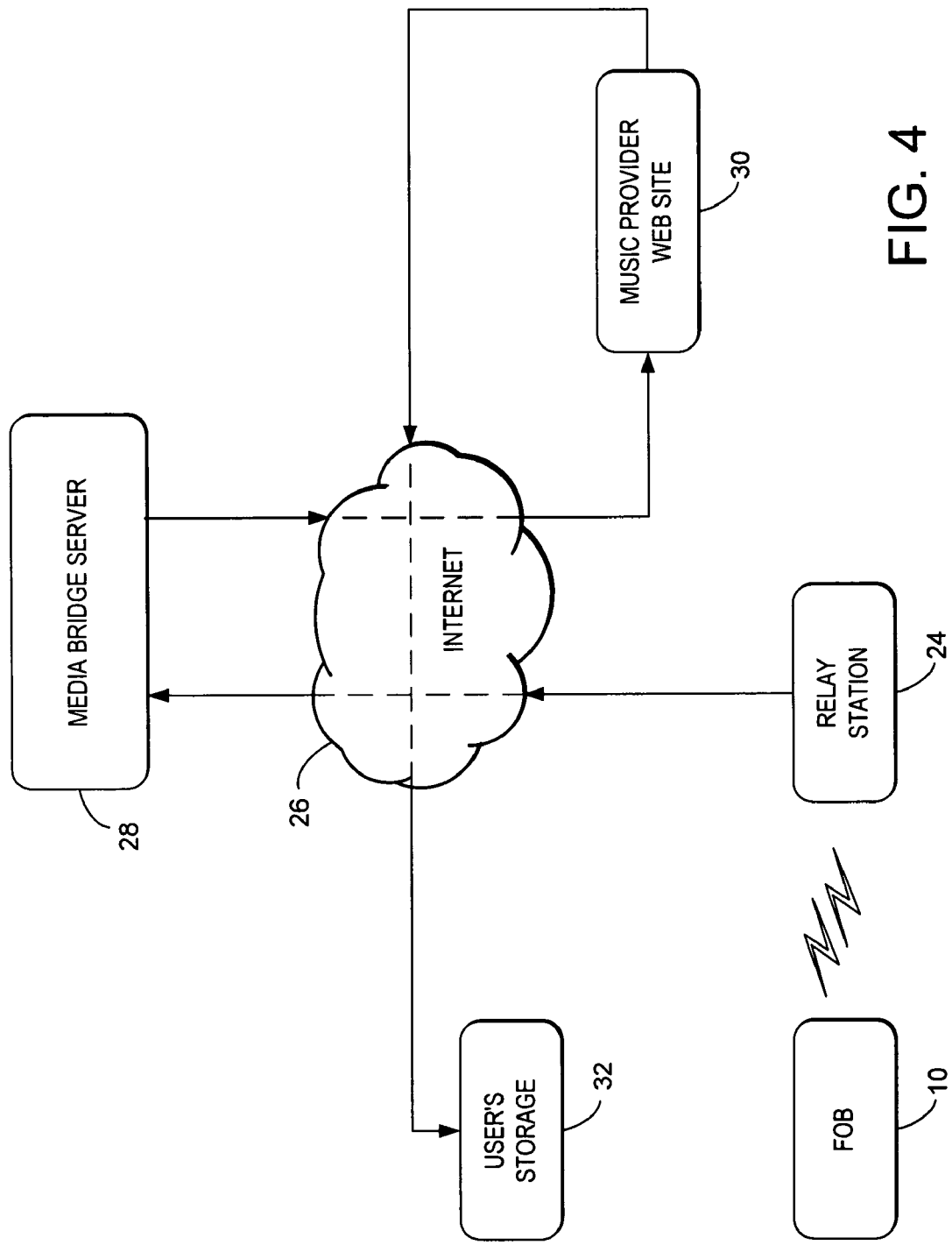

FIG. 4 is a block diagram of a system in which the device of FIG. 3 may be utilized.

Description

Referring to FIG. 3, a device 10 according to one embodiment includes a microphone 12, an A/D converter 13, a processor 14, one or more indicators 16, one or more buttons 18, a wireless interface 20, and a power source 22.

The device can be packaged in a small plastic housing, preferably as small as is practical (e.g., sized and configured to serve as a key chain ornament, perhaps akin to the Tomagatchi toys that were recently popular). The housing has one or more small holes to permit audio penetration through the housing to the microphone 12.

The processor 14 can take various forms, including a dedicated hardware device (e.g., an ASIC), a general purpose processor programmed in accordance with instructions stored in non-volatile RAM memory, etc.

The indicators 16 can be as simple as a single LED lamp, or as complex as an alphanumeric LCD or other multi-element display. In one embodiment, the indicator simply indicates when the processor has decoded a watermark in audio sensed by the microphone. More elaborate signaling techniques can of course be used, including two- or three-color LEDs that can be used to signal different states with different colors, indicators with flashing patterns or changing displays, etc.

The buttons 18 are used by the user to indicate an interest in the audio just-heard. In one embodiment, there is a single button 18, and it is emblazoned with a stylized legend that can serve as a trademark or service mark, e.g., GetIt!, GoFetch, Birddawg, something Batman-esque ("Wham," "Zappp," "Pow!!," etc.), or something more mundane (e.g., Capture).

The power source 22 can be a battery, solar cell, storage capacitor, or other source of energy suitable for powering the components of the device 10.

The wireless interface 20 serves to exchange data with a relay station 24 (FIG. 4). In one embodiment, the interface is radio-based, and provides a one-way communications channel. In other embodiments other wireless technologies can be used (e.g., IR), and/or two-way communication can be provided.

The relay station can be a cellular repeater (if the interface transmits using cellular frequencies and protocols), or a local receiver, e.g., associated with the user's computer. The relay station can also be a paging system relay station (e.g., as are used for two-way pagers), or may be a low earth orbit satellite-based repeater.

In operation, the processor monitors the ambient audio for the presence of encoded data, e.g., a digital watermark, and decodes same. If power considerations permit, the device is "always-on." In other embodiments, one of the buttons 18 can be used to awaken the device. In such other embodiments, another button-press can serve to turn-off the device, or the device can power-down after a predetermined period, e.g., of not sensing any watermarked audio.

A number of techniques for watermarking audio (and decoding same) are known, as illustrated by U.S. Pat. Nos. 5,862,260, 5,963,909, 5,940,429, 5,940,135, 5,937,000, 5,889,868, 5,833,432, 5,945,932, WO9939344 (corresponding to U.S. Pat. No. 6,145,081), and WO9853565 (corresponding to U.S. Pat. Nos. 5,940,135 and 6,175,627). Commercially-available audio watermarking software includes that available from AudioTrack, Verance (formerly Aris/Solana), Cognicity, Liquid Audio, and others.

The data payload encoded by the watermark (the audio-ID) may take various forms. One is a Digital Object Identifier—an ID corresponding to the standardized digital object numbering system promulgated by the International DOI Foundation (www.doi.org). Another is to include plural data fields variously representing, e.g., the name of the publisher, the name of the artist, the title of the work, the date of publication, etc., etc. Another is to encode a unique identifier (UID), e.g., of 16-64 bits. The UID serves as an index to a remote database where additional information (e.g., publisher, artist, title, date of publication, etc., are stored). The data transmitted from the device 10 to the relay station 24 typically includes some or all of the watermark payload data, and also includes data identifying the device 10, or its user (user-ID data). Again, this data can include several data fields (e.g. user name, audio delivery information such as email address or URL, age, gender, model of device 10, etc.). Alternatively, a serial number or other unique identifier can be used, which serves as an index to a database have a corresponding record of information relating to the user and/or device.

The audio-ID and user-ID data are typically formatted and encoded by the device 10 according to a protocol that provides error correcting, framing, and other data useful in assuring reliable transmission to the relay station, and/or for further transport.

Some embodiments of device 10 recognize just a single form of watermarking, and can understand only payload data presented in a single format. In other embodiments, the device may be capable of recognizing watermarking according to several different techniques, and with several different payload formats. This latter functionality can be achieved, e.g., by cyclically trying different decoding techniques until one that produces valid output data (e.g., by reference to a checksum or other indicia) is obtained. That decoding technique and payload interpretation can thereafter be used until valid output data is no longer obtained.

In some embodiments, the device 10 transmits data to the relay station at the moment the user presses the button 18. In other embodiments, a store-and-forward mode is used. That is, when the user presses the button 18, the decoded watermark data is stored in memory within the device. Thereafter, e.g., when the device is coupled with a "nest" or "holster" at the user's computer (or when download capability is otherwise activated), the stored data is downloaded—either through that device or otherwise.

The infrastructure between the device 10 and delivery of the audio to its ultimate destination can take myriad forms. One is shown in FIG. 4. In this arrangement, some or all of the data received by the relay station 24 is routed through the internet 26 to a server 28. (The server 28 can be a "MediaBridge" server of the type described, e.g., in the assignee's applications 60/164,619, filed Nov. 10, 1999, and Ser. No. 09/343,104, filed Jun. 29, 1999, and abandoned in favor of continuing application Ser. No. 10/764,430, filed Jan. 23, 2004.) Server 28 parses the data and routes some or all of it to a data repository 30 at which the audio requested by the user is stored. This repository, in turn, dispatches the audio to the user (e.g., to a computer, media player, storage device, etc.), again through the internet. (Address information detailing the destination 32 of the audio may be included in the data sent from the device 10, or can be retrieved from a database at the server 28 based on a user-ID sent from the device 10.)

In some embodiments, the repository 30 (which may be co-located with server 28, or not) includes various data beyond the audio itself. For example, the repository can store a collection of metadata (e.g., XML tags) corresponding with each stored item of audio. This metadata can be transmitted to the user's destination 32, or can be used, e.g., for rights management purposes (to limit the user's reproduction or re-distribution rights for the audio, etc.), to establish a fee for the audio, etc. One suitable metatag standard is that under development by <indecs> (Interoperability of Data in E-Commerce Systems, www.indecs.org).

The audio data can be delivered in streaming form, such as using technology available from RealNetworks (RealAudio), Microsoft (Windows Media Player), MP3, Audiobase, Beatnik, Bluestreak.com, etc. The former three systems require large (e.g., megabytes) player software on the receiving (client) computer; the latter do not but instead rely, e.g., on small Java applets that can be downloaded with the music.

Alternatively, the audio can be delivered in a file format. In some embodiments the file itself is delivered to the user's destination 32 (e.g., as an email attachment). In others, the user is provided a URL to permit access to, or downloading of, the audio. (The URL may be a web site that provides an interface through which the user can pay for the requested music, if pre-payment hasn't been arranged.)

The user's destination 32 is typically the user's own computer. If a "live" IP address is known for that computer (e.g., by reference to a user profile database record stored on the server 28), the music can be transferred immediately. If the user's computer is only occasionally connected to the internet, the music can be stored at a web site (e.g. protected with a user-set password), and can be downloaded to the user's computer whenever it is convenient.

In other embodiments, the destination 32 is a personal music library associated with the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from a transmitter associated with the server 28). In either case, the library can provide music to the user's playback devices by short-range wireless broadcast.

In many embodiments, technology such as that available from Sonicbox, permits audio data delivered to the computer to be short range FM-broadcast by the user's computer to nearby FM radios using otherwise-unused radio spectrum.

Some implementations support several different delivery technologies (e.g., streaming, file, URL), and select among them in accordance with the profiles of different users.

Payment for the audio (if needed) can be accomplished by numerous means. One is by charging of a credit card account associated with the user (e.g., in a database record corresponding to the user-ID).

Some implementations make use of secure delivery mechanisms, such as those provided by InterTrust, Preview Systems, etc. In addition to providing secure containers by which the audio is distributed, such systems also include their own secure payment facilities.

By such arrangements, a user can conveniently compile an archive of favorite music—even while away from home.

Having described and illustrated the principles of the subject technology with reference to a preferred embodiment and several variations thereof, it should be apparent that the detailed embodiment is illustrative only and should not be taken as limiting the scope of my work.

For example, while the technology is illustrated with reference to a button that is activated by the user to initiate capture of an audio selection, other interfaces can be used. For example, in some embodiments it can be a voice-recognition system that responds to spoken commands, such as "capture" or "record." Or it can be a form of gesture interface.

Likewise, while the technology is illustrated with reference to a stand-alone device, the same functionality can be built-into radios (including internet-based radios that receive wireless IP broadcasts), computer audio systems, and other appliances. In such case the microphone can be omitted and, in some cases, the wireless interface as well. (The data output from the device can be conveyed, e.g., through the network connection of an associated computer, etc.)

Moreover, while the technology is illustrated with reference to an embodiment in which audio, alone, is provided to the user, this need not be the case. As in the Dulles airport scenario in the introduction, the server 28 can provide to the user several internet links associated with the sensed audio. Some of these links can provide commerce opportunities (e.g., to purchase a CD on which the sensed audio is recorded). Others can direct the user to news sites, concert schedules, fan-club info, etc. In some such embodiments, the ancillary information is provided to the user without the audio itself.

Although not particularly detailed, the data provided to the user's destination typically includes information about the context in which the data was requested. In a simple case this can be the time and date on which the user pressed the Capture button. Other context information can be the identification of other Birddawg devices 10 that were nearby when the Capture button was pressed. (Such information can be gleaned, e.g., by each device transmitting a brief WhoAmI message periodically, receiving such messages from other nearby devices, and logging the data thus received.)

Still other context information might be the location from which the Capture operation was initiated. This can be achieved by decoding of a second watermark signal, e.g., on a low level white-noise broadcast. The public address system in public places, for example, can broadcast a generally-indiscernible noise signal that encodes a watermark signal. Devices 10 can be arranged to detect two (or more) watermarks from the same audio stream, e.g., by reference to two pseudo-random sequences with which the different watermarks are encoded. One identifies the audible audio, the other identifies the location. By such an arrangement, for example, the device 10 can indicate to the server 28 (and thence to the user destination 32) the location at which the user encountered the audio. (This notion of providing location context information by subliminal audio that identifies the location has powerful applications beyond the particular scenario contemplated herein.)

In some embodiments, the device 10 can buffer watermark information from several previous audio events, permitting the user to scroll back and select (e.g., in conjunction with a screen display 16) the ID of the desired audio.

An arrangement like the foregoing may require that the decoded watermark information be interpreted for the user, so that the user is not presented simply a raw binary watermark payload. The interpreted information presented to the user can comprise, e.g., the source (CNN Airport News, WABC Radio, CD-ROM, MTV), the artist (Celine Dion), the title (That's the Way It Is), and/or the time decoded (3:38:02 p.m.), etc.

One way to achieve the foregoing functionality is to convey both the binary UID payload and abbreviated text (e.g., 5- or 6-bit encoded) through the watermark "channel" on the audio. In one such arrangement, the watermark channel conveys data a UID, four characters of text, and associated error-correcting bits, every ten seconds. In the following ten seconds the same UID is conveyed, together with the next four characters of text.

Another way to achieve such functionality is to provide a memory in the device 10 that associates the watermark payload (whether UID or field-based) with corresponding textual data (e.g., the source/artist/title referenced above). A 1 megabyte semiconductor non-volatile RAM memory, for example, can serve as a look-up table, matching code numbers to artist names and song titles. When the user queries the device to learn the identify of a song (e.g., by operating a button 18), the memory is indexed in accordance with one or more fields from the decoded watermark, and the resulting textual data from the memory (e.g. source/artist/title) is presented to the user.

Such a memory will commonly require periodic updating. The wireless interface 20 in device 10 can include reception capabilities, providing a ready mechanism for providing such updated data. In one embodiment, the device "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of update data for the memory can be substituted for wireless delivery. For example, a source/artist/title memory in the device 10 can be updated by placing the device in a "nest" every evening. The nest (which may be integrated with a battery charger for the appliance) can have an internet connection, and can exchange data with the device by infrared, inductive, or other proximity-coupling technologies, or through metal contacts. Each evening, the nest can receive an updated collection of source/artist/title data, and can re-write the memory in the device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener may send a copy of the song to the friend. This instruction can be issued by pressing a "Send" button, or by invoking a similar function on a graphical (or voice- or gesture-responsive) user interface. In response, the device so-instructed can query the person as to the recipient. The person can designate the desired recipient(s) by scrolling through a pre-stored list of recipients to select the desired one. (The list can be entered through a computer to which the device is coupled.) Alternatively, the user can type-in a name (if the device provides a keypad), or a portion thereof sufficient to uniquely identify the recipient. Or the person may speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should be stored or queued, the format in which the music should be delivered, etc.) stored therein. In response to such command, the appliance dispatches instructions to the server 28, including an authorization to incur any necessary charges (e.g., by debiting the sender's credit card). Again, the server 28 attends to delivery of the music in a desired manner to the specified recipient.

Still further, a listener may query the device (by voice, GUI or physical button, textual, gesture, or other input) to identify CDs on which the ambient audio is recorded. Or the listener may query the device for the then-playing artist's concert schedule. Again, the appliance can contact a remote database and relay the query, together with the user ID and audio ID data. The database locates the requested data, and presents same to the user—either through a UI on device 10, or to the destination 32. If desired, the user can continue the dialog with a further instruction, e.g., to buy one of the CDs on which the then-playing song is included. Again, this instruction may be entered by voice, GUI, etc., and dispatched from the device to the server, which can then complete the transaction in accordance with pre-stored information (e.g. credit card account number, mailing address, etc.). A confirming message can be relayed to the device 10 or destination 32 for presentation to the user.

While the detailed arrangements particularly contemplate audio, the principles detailed above find applications in many other media, and in many other applications of the MediaBridge server 28.

Moreover, while the detailed arrangements particularly contemplate watermarks as the channel by which audio is identified, in other embodiments different techniques can be used. For example, digital radio protocols provide ID fields by which audio can be identified. Similarly, IP protocols for internet delivery of radio include identification fields within their packet formats. Accordingly, audio distributed according to formats that include audio IDs therein can likewise be employed.

Excerpts Adapted from Application 60/134,782

Brief Description of the Drawings

Figure 5:
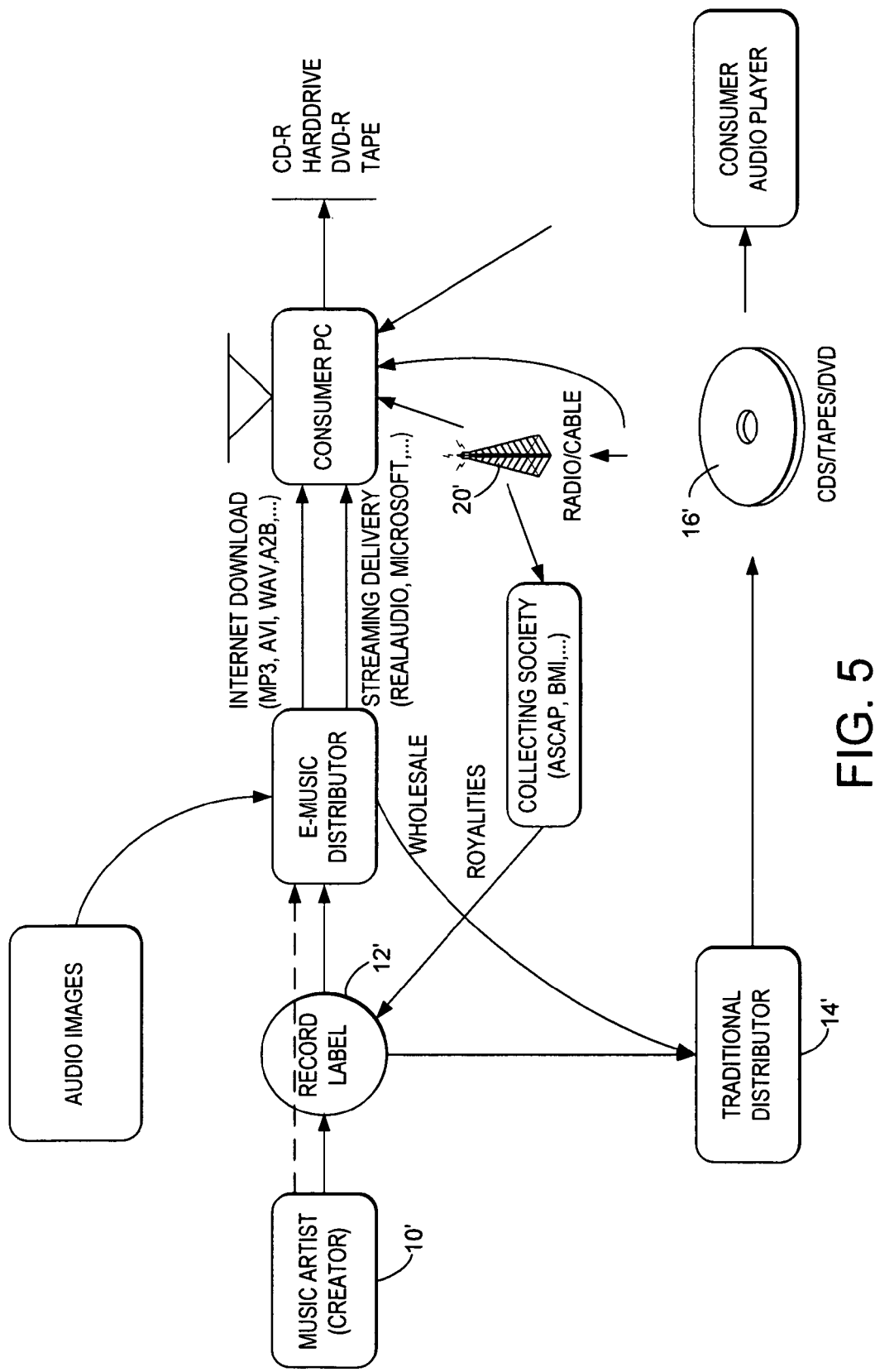

FIG. 5 is a diagram showing the participants, and channels, involved in the distribution of music.

Figure 6:
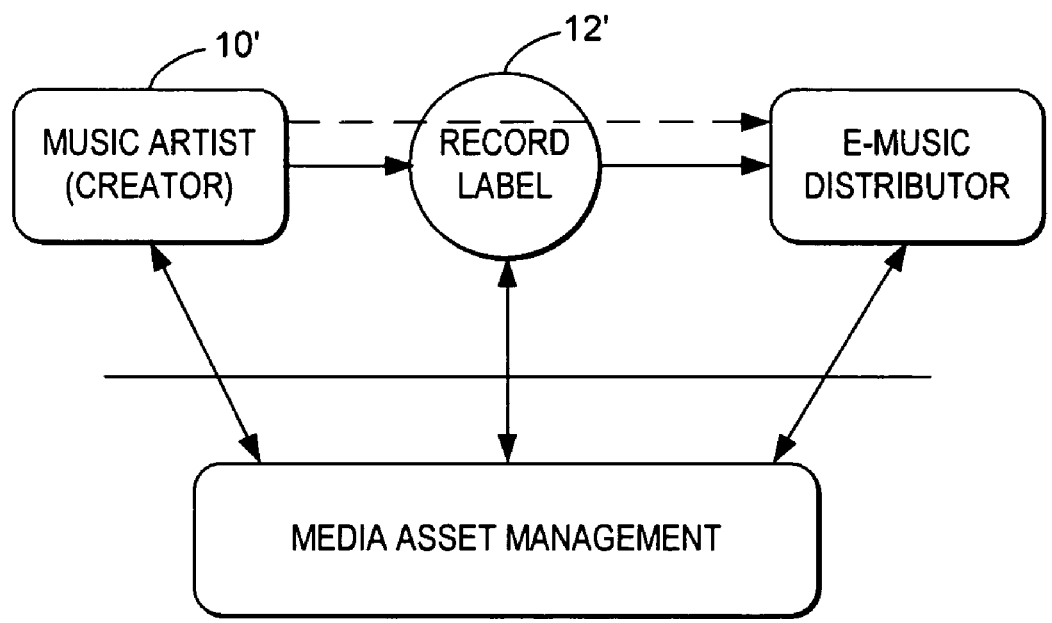

FIG. 6 shows a conceptual model of how music artists, record labels, and E-Music distributors can all interact with a Media Asset Management System, of which several are detailed in the following specification.

Figure 7:

FIG. 7 is an illustration of the prior art Diamond Rio personal digital audio player.

Figure 8:
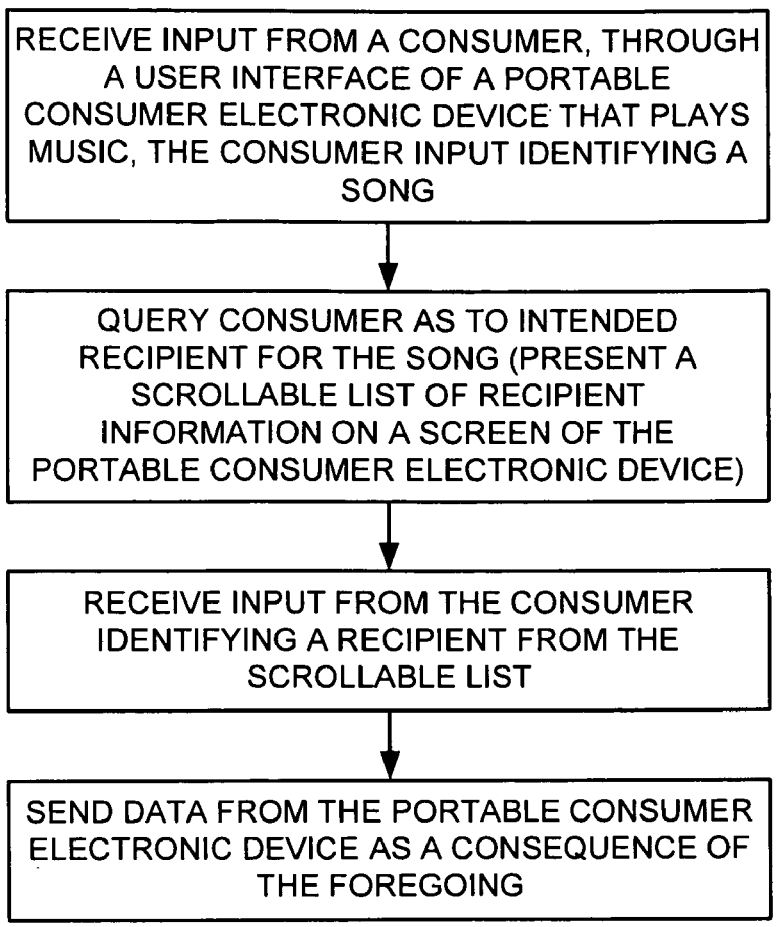

FIG. 8 details a method incorporating aspects of the present technology.

Figure 9:
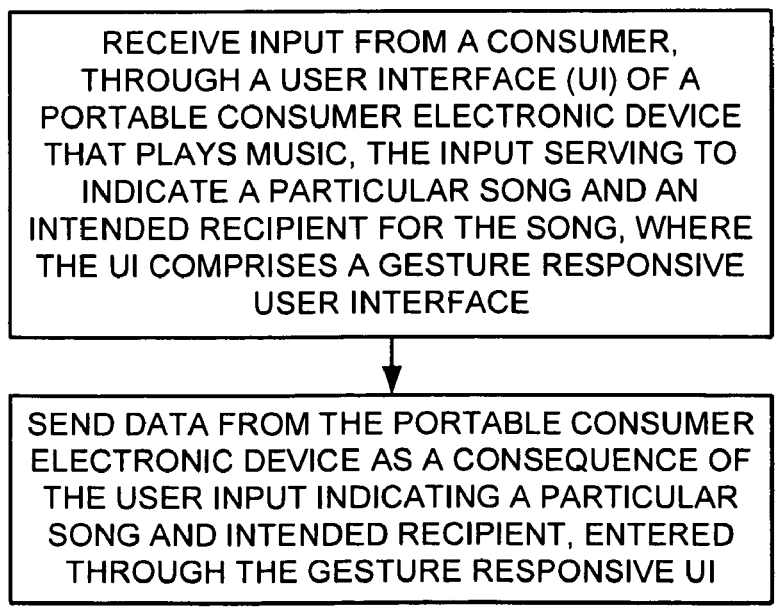

FIG. 9 details another method incorporating aspects of the present technology.

Description

For expository convenience, much of the following discussion focuses on music, but the same principles and techniques are largely or wholly applicable to other source data, whether non-music audio, video, still imagery, printed materials, etc.

Music Asset Management

Referring to FIGS. 1 and 2, the music distribution process begins with a creative artist 10'. The artist's music has traditionally been distributed by a record label 12'. (While the following discussion refers to distribution through such a label, it should be understood that such distribution can just as well be effected directed under the artist's control, without a record label intermediary.)

In traditional distribution 14', the record label produces tangible media, such as records, tapes, videos (e.g. music videos), and CDs 16'. These media are physically distributed to end-consumers 18'. Additionally, the label 12' distributes the music media to outlets 20', such as radio and TV stations, cable and satellite systems, etc., which broadcast (or narrowcast) the artist's work to an audience. Distribution through such media outlets may be monitored by playout tracking services. Playout tracking data, collected by firms including Arbitron, Nielsen, ASCAP, BMI, etc., can be used to compute royalty payments, to verify broadcast (e.g. for advertising), etc.

Increasingly, the distribution of the music to the media outlets is performed electronically. Such distribution first took the form of analog audio over high quality landlines or satellite channels. Digital audio quickly supplanted analog audio in such distribution channels due to higher fidelity.

More recently, distribution of the music from the record labels to the media outlets has occurred over secure links, now including the internet. Such security was first provided simply by scrambling the audio signal or data. More sophisticated "container"-based systems are now coming into vogue, in which the audio is "packaged" (often in encrypted form) with ancillary data.

Electronic distribution of music to the consumer is also gaining popularity, presently in the MP3 format primarily. The music providers may deal directly with the public, but more commonly effect such consumer distribution through a newly emerging tier of digital media outlets, such as internet sites that specialize in music. From such sites, consumers can download digital audio files into personal digital audio players. (The Diamond Rio (FIG. 7), and the Audible Mobile-Player devices are some of the first of what will doubtless be a large number of entrants into this personal internet audio appliance market.) Or the downloaded data can be stored by the consumer-recipient onto any other writeable media (e.g. hard disk, CD, DVD, tape, videotape, etc.). Typically a personal computer is used for such downloading, but this intermediary may be dispensed with by coupling next generation of personal audio appliances to an internet-like link.

The data downloaded by the consumer can be stored either in the native digital format, translated into another digital format (which translation may include decryption), converted into analog and recorded in analog form, etc.

Unauthorized copying or use of the music can occur anywhere in the foregoing channels. However, one of the greatest risks occurs once the music has been delivered to the consumer (whether by tangible media, by traditional broadcast media outlets, by emerging digital distribution, or otherwise).

The general idea of embedding auxiliary data into music (i.e. watermarking) has been widely proposed, but so far has been of limited applicability.

For example, GoodNoise is planning to embed a digital signature—termed a multimedia identifier, or MMI—in its MP3 music. MMI will register the song and its author with a licensing number. In addition to providing information about the songwriter and distributor, this digital encoding may also include lyrics, liner notes, and other information. But all of the proposed uses serve only to convey information from the distributor to the consumer; use for "tracking" is actively disclaimed. (Wired News, "GoodNoise Tags MP3 Files," Feb. 3, 1999.)

The Genuine Music Coalition—a partnership of various companies in the music distribution business—likewise has announced plans to employ watermarking of MP3 music. The watermarking technology, to be provided by Liquid Audio, will convey data specifying the artist or producer contact, copyright data, and a number to track ownership. The Coalition hopes that the provision of this embedded information will help thwart piracy. Industry observers believe Liquid Audio will next introduce playback technology only plays audio in which its watermark is detected. (Wired News, "Liquefying MP3," Jan. 23, 1999.)

A similar initiative has been announced by the Recording Industry Association of America (RIAA). Termed the Secure Digital Music Initiative (SDMI), the program seeks to define a voluntary specification that will assure proper compensation to those who produce and distribute music. One element of the system will likely be a watermarking component. (Dow Jones Newswire, "Spurred By Maverick Technology, Music Industry Eyes Web," Dec. 31, 1998.)

Yet another initiative has been announced by Solana and ASCAP. Other companies promoting watermarking for music include Aris Technology, MCY.com, and AudioSoft.

The watermark payload can represent various types of data. An exemplary payload includes data relating to the artist, distribution entity, title, and copyright date/proprietor. Additionally, the payload can include a digital object identifier—an ISBN-like number issued by a central organization (e.g. a rights management organization) to uniquely identify the work.

Such payload data can be encoded literally (e.g. the title by a series of ASCII characters, etc.). In other embodiments, codes or abbreviations can be employed—with each code having a known meaning. In still other embodiments, the data can be meaningless by itself, but may serve as a key (e.g., a Unique Identifier, or UID) into a remote data database or repository. An example of such a remote data repository is a web site at a Master Global Address (MGA) associated with content, as detailed below.

An exemplary data payload may, for example, have the following format:

| A | B | C | D | E | F | G | H | I |

Where A is a six-byte (8-bits to a byte) ASCII string serving as a digital object identifier (which may serve as a link to a Master Global Address through a default name server, as discussed below), B is a two-byte ASCII field serving as a key into an "artist" field of the remote database, C is a three-byte ASCII field serving as a key into a "title" field of the remote database; D is a 14-bit field serving as a key into a "label" field of the remote database, E is an 8-bit integer representing the work's year of first publication (with 0 representing the year 2000); F is a 10-bit field serving as a key into a "price" field of the remote database, G is a two-byte usage control string (detailed below), H is a streaming data channel, and I is a string of bits serving as a cyclic redundancy checksum for the foregoing. (More sophisticated error correcting checksums can, of course, be employed.) This payload format totals 136 bits, exclusive of the CRC coding and the streaming data channel.

This payload is encoded repeatedly, or redundantly through the music, so that the full payload can be decoded from partial excerpts of the music.

The encoding is also desirably perceptually adaptive, so that higher energy encoding is employed where the listener is less likely to perceive the additional "noise" introduced by the encoding, and vice versa. Various techniques for perceptually adaptive encoding are known. For example, some tie the amplitude of the encoded signal to the instantaneous amplitude of the music. Others exploit psychoacoustic "masking" of one signal by a spectrally- or temporally-adjoining signal of higher energy. Still other approaches fill gaps in the music's spectrum with watermark energy.

In other embodiments, perceptually adaptive encoding is not used. In some such embodiments, no tailoring of the temporal or spectral characteristics of the watermark signal is employed. In others, the watermark signal is spectrally filtered to emphasize low frequency audio components (e.g. less than 500 hz), high frequency audio components (e.g. higher than 2500 hz), or mid-frequency audio components (500-2500 hz).

The streaming data field channel (H) is a medium by which data can be conveyed from a distribution site (or other site) to the end user. Such data may be entirely unrelated to the underlying work. For example, it may serve a utilitarian purpose, such as conveying data to a memory in the consumer device to replace previously-stored data that is out-of-date. It may be a commercial channel on which bandwidth is sold for access to the consumer or the consumer's device. Essentially any purpose can be served by this streaming data field. Unlike most of the other fields, the streaming data field may not endlessly repeat the same data, but can convey data that changes with time.

Desirably, the encoding is performed in a manner permitting recovery of the watermark data even if the audio is corrupted, e.g. by format conversion, re-sampling, tape wow and flutter, compression, coding, or various forms of audio processing (e.g. filtering, pre-emphasis, re-scaling, etc.). One way to provide for such robustness is to encode a signal of known character that can be recognized through all such corruption. By identifying such known signal, the watermark signal can then be decoded. (The known signal can take various forms, e.g. a synchronization signal, a marker signal, calibration signal, a universal code signal as described in applicant's patents, etc.)

In some embodiments, a watermark "dial-tone" signal is provided. This dial-tone signal is a low amplitude, relatively wideband, repetitive signal that commonly conveys only limited information (e.g. a single bit of information). Its presence in an audio signal can serve as a "do not record," or similar instruction signal. Alternatively, or in addition, the dial-tone signal can serve as an aid in "locking" to a plural-bit digital watermark signal that is also encoded in the audio. For example, the cyclical repetition of the signal can serve to identify the start of the plural-bit digital watermark signal. Or the spectrum or repetition rate of the signal can identify any temporal corruption of the audio. An exemplary such signal is detailed as a "simple universal code" in U.S. Pat. No. 5,636,292.

A track of music can be pre-authorized for specified types of use. For example, the usage control string of the watermark payload may include a six-bit field detailing the classes of devices for which the audio is authorized. Each bit would correspond to a different class of device. Class 1 devices may be personal playback devices with only analog-audio output. Class 2 devices may be personal entertainment devices capable of outputting music in digital (e.g. MP3, redbook, *.WAV) format, as well as analog audio. Class 3 devices may be personal computer systems (i.e. with essentially unlimited ability for processing and outputting digital audio). Etc., etc. A device to which such MP3 audio is provided would check the usage control string data to determine whether it is authorized to utilize the audio. A personal playback device with analog-only output, for example, would examine the first bit of the usage control string. If it was "1," the device would be authorized to use (i.e. playback) the MP3 data; if it was a "0," the device would refuse to play the music.

In addition to pre-authorization for certain classes of devices, the usage control string can also include bits indicating the number of permitted playbacks. This data can be encoded in bits seven through nine, representing eight possibilities:

0—no playback permitted
1—single playback permitted
2—two playbacks permitted
3—three playbacks permitted
4—four playbacks permitted
5—five playbacks permitted
6—10 playbacks permitted
7—unlimited playbacks permitted
8—refer to associated data (within the watermark, or stored at a remote site) which specifies number of permitted playbacks.

The playback device may include a non-volatile store in which the number of permitted playbacks is stored for each track of music. The device would decrement this number at the beginning of each playback.

The usage control string can also include a two-bit field (bits ten and eleven) indicating recording permissions. A value of 0 means that data corresponding to the MP3 audio (regardless of digital format) should never be made available to another digital device. A value of 1 means that the data corresponding to the MP3 data may be made available once to another digital device. A value of 2 means that the data may be made available an unlimited number of times to other digital devices. (Value 3 is reserved.)

Another data field that can be included in an audio watermark is a rating that indicates age-appropriateness. Music with violence or sexual themes might be given a rating akin to the MPAA "PG-13" or "R" rating. Audio appliances may be programmed to recognize the rating of incoming music, and to interrupt playback if the rating exceeds a certain threshold setting. Various known techniques can be employed to assure that such settings cannot readily be changed, e.g., by juvenile listeners.

Another data field that can be included in an audio watermark is a date field. This field can indicate either the date the music was watermarked, or a date in the future on which certain rights associated with the music should change. Some consumers, for example may not wish to purchase perpetual playback rights to certain musical selections. The right to play a selection for 6 months may suffice for many consumers, especially if the price is discounted in view of the limited term. Such an arrangement would not be wholly disadvantageous to music distributors, since some consumers may end up purchasing music twice if their initial assessment of a musical selection's appeal was too short-sighted. (Naturally, the playback equipment would require a source of real-time clock data against which the date field in the watermark can be checked to ensure that the playback rights have not yet expired.)

Another of the data fields that can be included in an audio watermark specifies technical playback parameters. For example, the parameter can cause the playback appliance to apply a spectral equalization that favors bass frequencies, or treble frequencies, or mid-range frequencies, etc. Other preconfigured equalization arrangements can similarly be invoked responsive to watermark data. Likewise, the parameter can invoke special-effects provided by the playback appliance, e.g., echo effects, reverb, etc. (Again, such parameters are usually represented in an abbreviated, coded form, and are interpreted in accordance with instructions stored in a memory (either in the playback appliance, or linked thereto).

The same data fields and principles can be applied to non-audio content. In video, for example, watermarked data can adaptively control the display monitor or playback parameters (e.g., color space) to enhance the viewing experience.

Music Asset Management/Commerce

The majority of domestic music piracy is not organized. Rather, it is a crime of opportunity and convenience. If the crime were made more difficult, the alternative of obtaining a copy through legitimate channels would be less onerous. Similarly, if the procedure for obtaining a copy through legitimate channels were simplified, the incentive for piracy would be reduced. Watermarking facilitates both—making the crime more difficult, and making legitimate music acquisition easier.

Consider, for example, the pricing of music in conventional record stores. A CD (compact disk) may cost $15, but its sale may be driven by just one or two popular songs on the disk. To obtain these songs, the consumers must purchase the entire disk, with perhaps a dozen songs of no particular interest. This, in essence, is a tying arrangement that benefits the record labels while prejudicing the consumers. Given these circumstances, and a ready opportunity to make copies, it is not surprising that customers sometimes make illicit copies.

One classic technique of avoiding purchase of a complete collection of music, when only one or two songs is desired, is to record the music off the radio. While of dubious legality, this technique was popular in the era of combined cassette/radio players. However, the desired music was sometimes difficult to encounter in a radio broadcast, and the quality was less than superb.

The combined cassette/radio player has now evolved into a general purpose computer with wide-ranging functionality, and other sophisticated devices. Music can be acquired off the web, and can be recorded in various forms (e.g. in a personal MP3 player, stored on a hard disk, stored on a writeable CD-ROM, played back and recorded on analog cassette, etc., etc.). The quality can be quite high, and the erratic broadcast time problems of radio broadcasts have been overcome by the web's on-demand delivery mechanisms. (Moreover, the music can be downloaded in faster-than-realtime, a further benefit over recording-off-the-air techniques.)

One hybrid between the new and old is a novel radio (e.g., for use in a car) that has a "capture" button on the front panel (or other form of user interface, e.g., a Capture icon on a GUI). If a user hears a song they want to record and keep, they press the Capture button while the song is playing. In response, the radio device decodes a watermark embedded in the music, and thereby knows the identity of the music. The radio then makes a wireless transmission identifying the user and the desired song. A local repeater network picks up the wireless signal and relays it (e.g. by wireless rebroadcast, by modem, or other communication medium) to a music clearinghouse. The clearinghouse charges the user a nominal fee (e.g. via a pre-arranged credit card), and queues the music for download to a predetermined location associated with the user.

In one embodiment, the predetermined location is the user's own computer. If a "live" IP address is known for the user's computer, the music can be transferred immediately. If the user's computer is only occasionally connected to the internet, the music can be stored at a web site (e.g. protected with a user-set password), and can be downloaded to the user's computer whenever it is convenient.

In other embodiments, the predetermined location is a personal music library maintained by the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from the clearinghouse). In either case, the library can provide music to the user's playback devices by short-range wireless broadcast.

By such arrangement, a user can conveniently compile an archive of favorite music—even while away from home.

Many variants of the foregoing are of course possible. The radio can be a portable unit (e.g. a boombox, a Walkman radio, etc.), rather than an automotive unit. The UI feature employed by the user to initiate capture a musical selection need not be a button (physical or on-screen). For example, in some embodiments it can be a voice-recognition system that responds to spoken commands, such as "capture" or "record." Or it can be a form of gesture interface.

Instead of decoding the watermark only in response to the user's "capture" command, the radio can decode watermarks from all received programs, and keep the most recent in a small FIFO memory. By such arrangement, the user need not issue the capture instruction while the song is playing, but can do so even after the song is finished.

In some embodiments, data corresponding to the watermark can be made available to the user in various forms. For example, it can be presented to the user on an LCD screen, identifying the artist and song currently playing. If a corresponding UI button is activated, the device can so-identify the last several selections. Moreover, the data need not be presented to the user in displayed form; it can be annunciated by known computer-speech technologies instead.

In embodiments in which the watermark does not convey ASCII text data, but instead conveys UIDs, or coded abbreviations, the device must generally interpret this data before presenting it to the user. In an illustrative embodiment, the device is a pocket-sized FM radio and is equipped with a 1 megabyte semiconductor non-volatile RAM memory. The memory includes a data structure that serves as a look-up table, matching code numbers to artist names and song titles. When the user queries the device to learn the identify of a song, the memory is indexed in accordance with one or more fields from the decoded watermark, and the resulting textual data from the memory (e.g. song title and artist) is annunciated or displayed to the user.

In most applications, such memory will require frequent updating. The RF receiver provides a ready mechanism for providing such updated data. In one embodiment, the radio "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of updated memory data can be substituted for wireless delivery. For example, the artist/song title memory in the personal player can be updated by placing the player in a "nest" every evening. The nest (which may be integrated with a battery charger for the appliance) can have an internet connection, and can exchange data with the personal device by infrared, inductive, or other proximity-coupling technologies, or through metal contacts. Each evening, the nest can receive an updated collection of artists/song titles, and can re-write the memory in the personal device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener can send a copy of the song to the friend. This instruction can be issued by pressing a "Send" button, or by invoking a similar function on a graphical (or voice- or gesture-responsive) user interface. In response, the appliance so-instructed can query the person as to the recipient. The person can designate the desired recipient(s) by typing in a name, or a portion thereof sufficient to uniquely identify the recipient. Or more typically, the person can speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the clearinghouse, including an authorization to debit the sender's credit card for the music charge. Again, the clearinghouse attends to delivery of the music in a desired manner to the specified recipient.

Still further, a listener may query the appliance (by voice, GUI or physical button, textual, gesture, or other input) to identify CDs on which the then-playing selection is recorded. Or the listener may query the appliance for the then-playing artist's concert schedule. Again, the appliance can contact a remote database, relay the query, and forward data from the watermark payload identifying the artist and/or song title to which the query relates. The database locates the requested data, and relays same back to the appliance for presentation (via a display, by machine speech, or other output) to the user. If desired, the user can continue the dialog with a further instruction, e.g., to buy one of the CDs on which the then-playing song is included. Again, this instruction may be entered by voice, GUI, etc., and dispatched from the appliance to the clearinghouse, which can then complete the transaction in accordance with pre-stored information (e.g. credit card account number, mailing address, etc.). A confirming message is relayed to the appliance for presentation to the user.

While the foregoing transactions require a link to a remote site or database, other watermark-based consumer services can be provided without such a link. For example, a user can query the appliance as to the artist or song-title of the selection currently playing. The appliance can consult the embedded watermark data (and optionally consult a memory to determine the textual names associated with coded watermark data), and provide the requested information to the user (e.g., by a display, annunciation, or other output).

The foregoing concepts (e.g. Capture, Send, etc.) can also be employed in connection with internet-rather than radio-delivery of music. (The following discussion is illustrated with reference to the "Capture" function, but it will be recognized that the other earlier-discussed features can be similarly implemented.)

There are many commercial web sites that sell audio (in CD form or otherwise), and offer limited free music downloads, (or music clips) as an enticement to lure consumers. But there are also a great number of music web sites that have no commercial pretense. They are hosted by music lovers strictly for the enjoyment of other music lovers. When music is downloaded from such a web site, the end-user's computer can analyze the digital data to decode watermark data therefrom. Again, the user can be presented with a "Capture" button that initiates a commercial transaction, by which a complete copy of the then-downloaded audio is sent to a prearranged storage location, and the user's credit card is debited accordingly. This transaction can occur independently of the site from which the music is downloaded (e.g. through the clearinghouse referenced above).

While the "Capture" button can be presented on the website, this would generally not be in keeping with the non-commercial nature of such web sites. Instead, in an exemplary embodiment, the Capture feature is a software program resident at the user's computer. When this software program is invoked by the user, a socket channel is instantiated between the user's computer and the clearinghouse over the then-existing internet connection. The decoded watermark data and user ID is transmitted to the clearinghouse over this channel, without interrupting the user's other activity (e.g. downloading music from the non-commercial web site). In response, the clearinghouse transmits the music to the prearranged location and attends to billing.

In some embodiments, a watermark detector is included as part of the operating system, and constantly monitors all TCP/IP, or other internet, data received by the user's computer, for the presence of watermarks. In such case, when the Capture feature is invoked, the program examines a memory location in which the operating system stores the most-recently received watermark data. In another embodiment, the computer does not monitor all internet traffic for embedded watermark data, but includes an API that can be called by the Capture program to decode a watermark from the data then being received. The API returns the decoded watermark data to the Capture program, which relays same to the clearinghouse, as above. In still another embodiment, the watermark decoder forms part of the Capture program, which both decodes the watermark and relays it to the clearinghouse when the Capture program is invoked by the user.

There are various techniques by which the Capture program can be selectively invoked. One is by a keyboard macro (e.g. by a combination of keyboard keys). Another is by a program icon that is always presented on the screen, and can be double-clicked to activate. (Again, confirmation processes may be called for, depending on the likelihood of inadvertent invocation.) Many other techniques are likewise possible.

In the just-contemplated scenario, the Capture operation is invoked while the user is downloading music from a non-commercial web site. This seems somewhat redundant, since the downloading—itself—is transferring music to the user's computer. However, the Capture operation provides added value.

In the case of streaming audio, the audio is not typically stored in a location in which it can be re-used by the consumer. It can be listened-to as delivered, but is then gone. Capturing the audio provides the user a copy that can be played repeatedly.

In the case of downloaded music files, the music may have been encoded to prevent its recording on other devices. Thus, while the user may download the music onto a desktop computer, copy-prevention mechanisms may prevent use of that file anywhere else, e.g. on a portable music appliance. Again, Capturing the audio provides the user a copy that can be transferred to another device. (The music file provided by the clearinghouse can have copy-prevention limits of its own—e.g., the file can be copied, but only once, or the file can be copied only onto devices owned by the user.)

(Confirmation of device ownership can be implemented in various ways. One is to identify to the clearinghouse all music devices owned by a user at the time the user registers with the clearinghouse (supplemented as necessary by later equipment acquisitions). Device IDs associated with a user can be stored in a database at the clearinghouse, and these can be encoded into the downloaded music as permitted devices to which the file can be copied, or on which it can be played.)

The commerce opportunity presented by non-commercial music web-sites is but one enabled by digital watermarks. There are many others.

To take one example, consider the media by which music and artists are presently promoted. In addition to radio airtime, these include music videos (a la MTV), fan magazines, web advertisements, graphical icons (e.g. the Grateful Dead dancing bears), posters, live events, movies, etc. Watermarked data can be used in all such media as a link in a commercial transaction.

A poster, for example, typically includes a photo of the artist, and may comprise cover-art from a CD. The photo/art can be digitally watermarked with various types of data, e.g., the artist's identify, the record label that distributes the artist's work, the music project being particularly promoted by the poster (e.g. a CD, or a concert tour), a fan web-site related to the artist, a web-site hosted by the record label for selling audio in CD or electronic form, a web-site from which free music by the artist can be downloaded, data identifying the poster itself, etc.

A user, equipped with a portable appliance that merges the functions of palmtop computer and digital camera, can snap an image of the poster. The processor can decode the watermarked data, and initiate any of various links based on the decoded data.

In an exemplary embodiment, after snapping the picture, the user invokes a software program on the device that exposes the various links gleaned from the snapped image data. Such a program can, for example, present the option of linking to the artist's fan web site, or downloading free streaming audio or music clips, or ordering the promoted CD, or requesting the above-noted clearinghouse to download a personal copy of selected song(s) by the artist to the user's personal music library, etc. (The device is presumed to have a wireless internet link. In devices not having this capability, the requested actions can be queued and automatically executed when a link to the internet is available.)

Still more complex transactions can be realized with the use of a remote database indexed by digital watermark fields decoded from the poster. For example, the poster may promote a concert tour. Fields of the digital watermark may identify the artist (by a code or full text), and a web site or IP address. The user appliance establishes a link to the specified site, and provides the artist identifier. In response, the site downloads the tour schedule for that artist, for display on the device. Additionally, the downloaded/displayed information can include a telephone number that can be used to order tickets or, more directly, can indicate the class of seats still available at each (or a selected) venue, and solicit a ticket order from the user over the device. The user can supply requested information (e.g. mailing address and charge card number) over the return channel link (wireless or wired, as the case may be), and the ticket(s) will be dispatched to the user. In the case of a wireless link, all of this can occur while the user is standing in front of the movie poster.

Similar systems can be implemented based on watermark data encoded in any other promotional media. Consider music videos. Using known TV/computer appliances, watermark data added to such videos can readily be decoded, and used to establish links to audio download, CD-sales, fan club, concert ticket outlet web sites, etc., as above.

Even live events offer such watermark-based opportunities. The analog audio fed to public address or concert speakers can be watermarked (typically before amplification) to encode plural-bit digital data therein. A next generation personal music appliance (e.g. one with a wireless interface to the internet) can include analog record capability (e.g. a built-in microphone, analog-to-digital converter, MP3 encoder, coupled to the unit's semiconductor memory). A user who attends a live event may record an excerpt of the music. The watermark can then be decoded, and the extracted data used to access the links and commerce opportunities reviewed above.

Cinema movies offer both audio and visual opportunities for watermark-based commerce opportunities. Either medium can be encoded to convey information of the types reviewed above. A personal appliance with image- or audio-capture capabilities can capture an excerpt of the audio or imagery, decode the watermark data therefrom, and perform any of the linking, etc., functions reviewed above.

The consumer-interest watermarks reviewed above are only exemplary. Many others will be recognized as useful. For example, promotional clips presented before a feature film presentation can include watermark data that point (either by a literally encoded web address link, or by an ID code that indexes a literal link in a remote link database) to reviewer critiques of the previewed movies. Watermark data in a featured film presentation can lead to web sites with information about the movie stars, the director, the producer, and can list other movies by each of these persons. Other watermark-conveyed web links can present opportunities to buy the movie on videotape, to purchase the movie soundtrack, to buy movie-related toys and games, etc.

(Aspects of the foregoing are shown in FIGS. 8 and 9.)

More on Device Control

Much of the foregoing has focused on watermark encoding to provide enhanced customer experiences or opportunities. Naturally, watermarks data can alternatively, or additionally, serve the interests of the media owner.

To illustrate, consider watermarked music. The media owner would be best served if the watermark serves dual purposes: permissive and restrictive. Permissively, music appliances can be designed to play (or record) only music that includes an embedded watermark signaling that such activity is authorized. By this arrangement, if music is obtained from an unauthorized source and does not include the necessary watermark, the appliance will recognize that it does not have permission to use the music, so will refuse requests to play (or record).

As noted, music appliances can respond restrictively to the embedded watermark data to set limits on use of the music. Fields in the watermark can specify any or all of (or others in addition to) (a) the types of devices on which the music can be played (b) the types of devices on which the music can be recorded; (c) the number of times the music can be played; (d) the number of times the music can be recorded, etc.

The device restrictions (a) and (b) can be of various types. In some embodiments, the restrictions can identify particular units (e.g. by serial number, registered owner, etc.) that are authorized to play/record the encoded music. Or the restrictions can identify particular classes of units (e.g., battery-powered portable players with music memories of less than 50 megabytes, disk-based dedicated music appliances, general purpose personal computers, etc.) Or the restrictions can identify particular performance quality criteria (e.g., two channel, 16-bit audio at 44.1 KHz sample rate, or lower quality).

The use restrictions (c) and (d) can likewise be of various types. Examples include "do not copy," "copy once only," "unrestricted copying permitted," "play once," "play N times" (where N is a parameter specified elsewhere in the watermarked data, or by reference to a database indexed by a watermark data field), "unrestricted playing permitted," etc.

It is straightforward to design a music appliance to respond to usage limits of zero (e.g. "do not copy") and infinity (e.g. "unrestricted copying permitted," and "unrestricted playing permitted"). The device simply examines one or more bits in the watermark data, and permits (or refuses) an operation based on the value thereof.

Implementation of the other usage-control restrictions can proceed in various ways. Generally speaking, the stored music can be altered to give effect to the usage-control restrictions. For example, if the music is "record-once," then at the time of recording, the appliance can alter the music in a fashion indicating that it now has "do not record" status. This alteration can be done, e.g., by changing the watermark data embedded in the stored music (or adding watermark data), by changing other data stored in association with the music, etc. If the original signal is stored (as opposed, e.g., to a streaming signal, such as an internet or wireless transmission), it too should be so-altered.

Likewise with playback limitations. The number of playbacks remaining can, e.g., be encoded in an updated watermark in the music, be tracked in a separate counter, etc.

More particularly considering the "copy once" usage restriction, an illustrative embodiment provides two distinct watermark payload bits: a "copy once" bit and a "copy never" bit. When originally distributed (whether by internet, wireless, or otherwise), the "copy once" bit is set, and the "copy never" bit is un-set.

When music encoded in this fashion is provided to a compliant recording device, the device is authorized to make one copy. (A compliant device is one that recognizes encoded watermark data, and behaves as dictated by the watermark.) When this privilege is exercised, the recording device must alter the data to ensure that no further copying is possible. In the illustrated embodiment, this alteration is effected by the recording device adding a second watermark to both the music, with the "copy never" bit asserted. The second watermark must generally be encoded in an "orthogonal" domain, so that it will be detectable notwithstanding the continued presence of the original watermark. Compliant equipment must then check for both watermarks, and refuse to copy if either is found to have the "copy never" bit asserted.

One advantage to this arrangement is that if the watermark signal has undergone some form of corruption (e.g. scaling or resampling), the first watermark may have been weakened. In contrast, the second watermark will be native to the corrupted signal, and thus be more easily detected. (The corruption may also contribute to the orthogonality of one watermark relative to the other, since the two watermarks may not have precisely the same time base or other foundation.)

An alternative approach is not to encode the "copy never" bit in the original music, but leave this bit (in whatever manifestation) blank (i.e. neither "1" nor "0"). In transform-based watermark techniques, this can mean leaving transform coefficient(s) corresponding to the "copy never" bit un-changed. If the watermarking is effected in the temporal sample domain (or spatial domain, for image data), this can mean leaving certain samples (pixels) unmodified. The recording device can then alter the transform coefficients and/or samples as necessary to assert the previously-unencoded "copy never" bit when the permitted recording is made.

In such a system, compliant recording devices check for the "copy never" bit in the sole watermark, and refuse to make a copy if it is asserted (ignoring the value of any "copy once" bit).

A third approach to "copy once" is to set both the "copy once" and "copy never" bits, but set the former bit very weakly (e.g. using lower gain and/or high frequency DCT coefficients that do not survive certain processing). The frail "copy once" bit is designed not to survive common corruptions, e.g., resampling scaling, digital to analog conversion, etc. To further assure that the "copy once" bit is lost, the recording device can deliberately add a weak noise signal that masks this bit (e.g. by adding a noise signal in the frequency band whose DCT coefficient conveys the "copy once" bit). In contrast, the "never copy" bit is unchanged and reliably detectable.

In such a system, compliant devices check for the "copy once" bit in the sole watermark, and refuse to make a copy if it is not detected as set.

These three examples are but illustrations of many possible techniques for changing the rights associated with a work. Many other techniques are known. See, e.g., the proposals for watermark-based copy control systems for digital video at the Copy Protection Technical Working Group, http://www.dvcc.com/dhsg/, from which certain of the foregoing examples are drawn. See also Bloom et al, "Copy Protection for DVD Video," IEEE Proceedings, Special Issue on Identification and Protection of Multimedia Information, June, 1999.

Scaleability

One feature that is desirable in many detector embodiments is scaleability. This refers to the ability of a detector to scale its computational demands to match the computational resources available to it. If a detector is running on a high performance Pentium III workstation, it should be "doing more" than if the same detector is running on a slow microcontroller. One way scalability can be achieved is by processing more or less chunks of input data (e.g. temporal excerpts of music, or blocks/macroblocks of pixels in a frame of video data) to decode watermarks. For example, an input audio stream might be broken into chunks of one second each. A fast processor may complete decoding of each chunk in less than a second, permitting it successively to process each chunk in the data stream. In contrast, a slow processor may require two and a half seconds to decode the watermark from a chunk. While it is processing a first chunk, the second and third pass by un-decoded. The processor next grabs and processes the fourth chunk, permitting the fifth and sixth to pass by un-encoded.

The detector running on the fast processor is clearly more difficult to "fool," and yields a decoded watermark of higher confidence. But both systems decode the watermark, and both operate in "real time."

The skipping of input data in the temporal (e.g. music or video) or spatial (e.g. image or video) domain is but one example of how scaleability can be achieved. Many other approaches are known to those skilled in the art. Some of these alternatives rely on spending more or less time in the data analysis phases of watermark decoding, such as cross-correlation operations.

Reference has been made to watermarked UIDs as referring to a database from which larger data strings (e.g. web addresses, musician names, etc.) can be retrieved. In some embodiments, the data record referenced by a UID can, in turn, point to several other database records. By such arrangements, it is often possible to reduce the payload of the watermark, since a single UID reference can lead to several different data records.

Production Tools

In the prior art, the watermark embedded in a source material is typically consistent and static through a work—unchanging from beginning to end. But as will be recognized from the foregoing, there are many applications that are better served by changing the watermark data dynamically during the course of the work. According to another aspect, a production tool is provided that facilitates the selection and embedding of dynamically-changing watermark data. One such embodiment is a software program having a user interface that graphically displays the different watermark fields that are being embedded in a work, and presents a library of data (textually or by icons) that can be inserted into each field, and/or permits the user to type in data to be encoded. Another control on the UI controls the advance and rewind of the media, permitting the user to determine the location at which different watermark data begins and ends. Graphical paradigms known from video- and audio-editing tools can be used to indicate the starting and ending frames/samples for each different watermark payload.

Such a tool can be of the standalone variety, or can be integrated into the desktop audio- and video-production and editing tools offered by vendors such as Avid, Adobe, Jaleo, Pinnacle Systems, SoundForge, Sonic Foundry, Xing Technology, Prosoniq, and Sonic Desktop Software.

Watermark-Based Receipts

Pay-for-content applications commonly assume that if content is transmitted from a server (or head-end, etc.), it is necessarily received. Sometimes this assumption is wrong. Network outages and interruptions and internet traffic load can diminish (e.g., dropped video frames), or even negate (e.g., failed delivery), expected consumer enjoyment of content. In such cases, the consumer is left to haggle with the content provider in order to obtain an adjustment, or refund, of assessed charges.

Watermarks provide a mechanism for confirming receipt of content. If a watermark is detected continuously during a download or other delivery event, a software program (or hardware device) can issue an electronic receipt attesting that the content was properly delivered. This receipt can be stored, and/or sent to the content distributor to confirm delivery.

In one embodiment, a content receiving device (e.g., computer, television or set-top box, audio appliance, etc.) periodically decodes a watermark from the received content to confirm its continued reception. For example, every five seconds a watermark detector can decode the watermark and make a record of the decoded data (or simply record the fact of continued detection of the same watermark). When a changed watermark is detected (i.e., reception of a different content object begins), the duration of the previously-received content is logged, and a receipt is issued.

In a related embodiment, the last portion (e.g., 5 seconds, frame, etc.) of the content bears a different "end of content" watermark that triggers issuance of a receipt. Such a watermark can indicate the length of the content, to serve as a cross-check against the periodic watermark polling. (E.g., if periodic sampling at 2 second intervals yields 545 samples corresponding to the same content, and if the "end of content" watermark indicates that the content was 1090 seconds long, then receipt of the entire content can be confirmed.)

In another embodiment, the watermark can change during the course of the content by including, e.g., a datum that increments every frame or other increment of time (e.g., frame number, time stamp, etc.). A watermark detector can monitor the continued incrementing of this datum throughout the content to confirm that no part was garbled (which would destroy the watermark) or was otherwise missing. Again, at the end of delivery, the receiving system can issue a confirmation that XXX frames/seconds/etc. of the identified content were received.

One application of such technology is to bill for content based on receipt, rather than transmission. Moreover, billings can be adjusted based on percentage of content-value received. If delivery is interrupted mid-way through (e.g., by the consumer disabling the content-receiving device), the nominal billing for the content can be halved. Some prolonged content, e.g., televised/web-broadcast university classes, cannot be "consumed" in one session, and are thus particularly well suited for such pay-as-you-consume billing.

Another application of such technology is in advertising verification. Presently, ads are tracked by transmission or, less frequently, by detection of an embedded code on receipt (c.f., Nielsen Media Research's U.S. Pat. Nos. 5,850,249 and 5,737,025). However, such reception-detectors—once triggered—generally do not further note the length of time that the advertising was received, so the same data is produced regardless of whether only five or fifty seconds of a commercial is presented. Watermark monitoring as contemplated herein allows the duration of the advertising impression to be precisely tracked.

In one application of this technology, recipients of advertising are provided incentives for viewing advertising in its entirety. For example, a content-receiving device can include a watermark detector that issues a receipt for each advertisement that is heard/viewed in its entirety. These receipts can be redeemed, e.g., for content tokens as described elsewhere herein, for monetary value, etc. In some embodiments, receipts are generic and can all be applied to a desired premium, regardless of the advertisements through which they were earned. In other embodiments, the receipts are associated with the particular advertisers (or class of advertisers). Thus, a TV viewer who accumulates 50 receipts from advertising originating from Procter & Gamble may be able to redeem same for a coupon good for $2.50 off any Procter & Gamble product, or receipts from Delta Airlines may be redeemed for Delta frequency flier miles (e.g., at a rate of one mile per minute of advertising). Such incentives are particularly useful in new forms of media that give the consumer enhanced opportunities to fast-forward or otherwise skip advertising.

(Although the foregoing "receipt" concept has been described in conjunction with watermark data (and use of watermark technology is believed to be inherently advantageous in this application), the same principles can likewise be implemented with ancillary data conveyed by other means.)

Master Global Address

As suggested above, it is desirable that each piece of content have a web address (the "Master Global Address" (MGA), or "Master IP Address") associated with it. Such address is typically conveyed with the content, e.g., by an IP address watermarked therein.

Consider a consumer who downloads a streaming video having an English language soundtrack. The viewer may not speak English, or may otherwise prefer to listen to the soundtrack in another language. The user can decode the watermark data embedded in the video and initiate a link to the associated web address. There the user is presented with a list of soundtracks for that content object in other languages. The viewer can click on the desired language and receive same via a second simultaneous transmission (e.g., a second socket channel). The consumer's audio/video appliance can substitute the desired audio track for the default English track.

If the streaming video and the alternative soundtrack are hosted on the same server, synchronization is straightforward. The process governing transmission of the alternative soundtrack identifies the process that is streaming video to the same IP address. Based on SMPTE, or other time/frame data, the former process syncs to the latter. (If the two data streams don't originate through the same server, time/frame data can be relayed as necessary to the alternative soundtrack server to effect synchronization.)

Another application of the Master Global Address is to serve as a point to which monitoring stations can report the presence, or passage, of content. Consider, for example, a copyright-aware node through which content signals pass, e.g., a computer node on a network, a satellite transponder, etc. Whenever the node detects passage of a media object (e.g., by reference to a file extension, such as MP3, JPG, AVI, etc.), it sends a "ping" over the internet to the address encoded in the object, simply reporting passage of the object. Similar monitoring facilities can be provided in end user computers, e.g., reporting FileOpen, FileSave, Printing, or other use of content bearing MGA data.

This system can be expanded to include "ping" and "pong" phases of operation. When a software application (or a user appliance, such as a video or audio playback device) encounters a media object (e.g., at time of file open, at time of playback, etc.), it pings the MGA site to report the encounter. The MGA site "pongs" back, responding with instructions appropriate to the encounter. For example, if the object requires payment of a fee before full functionality or access is to be granted, the MGA site can respond to the application with instructions that the object be used (e.g., played back) only in some crippled state preventing the user's full enjoyment (e.g., impaired resolution, or impaired sound quality, or excerpts only, etc.). The MGA site can also inform the user application of the terms (e.g., payment) by which full functionality can be obtained. The application can graphically or audibly present such information to the user, who can authorize a payment, if desired, so that the content can be enjoyed in a less- (or un-) crippled state. On receipt of the payment authorization, the MGA site can inform the user application that enhanced access/usage rights have been purchased, and that the application may proceed accordingly.

Yet another application of the MGA is to present the user of a content object a menu of options that is customized to that object.

In current graphical operating systems, when a user clicks on an icon (e.g., with the right mouse button), a menu is presented detailing actions that can be undertaken in connection with the icon, or the file represented thereby. Such options are pre-programmed (i.e., static), and are typically determined by the operating system based solely on the file extension.

In accordance with this aspect, clicking on an icon representing a media object initiates an internet link to the MGA site associated with the object. The MGA site responds with data that is used to customize the menu of options presented to the user in connection with that particular object.

Consider an icon representing a JPG image file. Right-clicking on the icon may yield a menu that gives the user various options presented by the operating system (e.g., delete, compress, rename), and additional options customized in accordance with data from the object's MGA site. These customized options may include, e.g., (a) open in 100×150 pixel format for free;
(b) open in 480×640 pixel format for ten cents;
(c) open in 960×1280 pixel format for twenty cents;
(d) purchase rights to use this image in a newsletter having a circulation of under 1000 for $1.25;
(e) display a complete listing of license options.

Clicking on options (b) or (c) initiates a commerce application through which funds are electronically transferred to the MGA site (by the above-described tokens or otherwise). In response, the MGA site responds (e.g., with TCP/IP or HTML instructions) authorizing an application on the user's computer to open the file in the requested manner. (The default application for JPG applications can then automatically be launched, or the computer may first query the user whether another application should be used instead.)

Clicking on option (d) proceeds as above, and permits full use of the image on the computer. Moreover, the MGA site sends a digital certificate to the user's computer memorializing the usage rights purchased by the consumer.

In this particular arrangement, no access control is placed on the content, e.g., by encryption, secure container technology, or the like. The nominal fees, and the ease of licensing, make it simple for the user to "do the right thing" and avoid copyright liability. In other embodiments, of course, known access control techniques can be used to limit use of the object until the requisite payment has been made.

Naturally, records of all such transactions are also logged at the MGA site.

Clicking on option (e) opens a browser window on the user's computer to a web site that presents a complete listing of license options available for that image. (The address of this web site is included in customization data relayed to the user device from the MGA site, but not explicitly shown to the user on the menu.) Through such web site, the user can select desired rights, effect payment, and receive the necessary authorization for software applications on the user's computer (or other media appliance) to open and/or process the content.

The object on which the user "clicks" needn't be an icon. It can be an image or other graphical representation. (And a "click" isn't necessary; a voice command or other signal may be used to the same effect with an audio clip or selection.)

Consider the popular merchandising of books and CDs over the internet. A JPG or other image file depicting the cover of a book, or the artwork of a CD cover, can be treated as a media object, and can include a watermarked MGA pointer. Right-clicking on such an image of a book cover could, through the MGA site, present to the user a menu of options that includes—in addition to those normally presented in conjunction with a JPG file—the following:

(a) "See the review of this book published in the New York Times on Apr. 19, 1999"
(b) "See the list of reviews of this book at Amazon.com"
(c) "Enter your own review of this book, for posting on Amazon.com"
(d) "See today's sales rank of this book at Amazon.com"
(e) "Purchase this book from Amazon.com for $16.95"
(f) "Purchase this book from Barnesandnoble.com for $19.95 and receive a $5.00 credit towards your next purchase"
(g) "Link to the web site that tells about the release of this title as a motion picture (presently scheduled to open on Oct. 10, 1999)"

(h) "Link to the Yahoo listing of web sites relating to this book"

(i) "Search Lycos for listings relating to this book."

If the user selects one of the purchase options from the menu, a pre-stored e-commerce profile—containing the user name, credit card number, billing address, ship-to address, etc., possibly in the form of an encrypted object—could be sent to the MGA site (or to the bookseller) to effect the purchase, or such selection could initiate display of additional screens or sub-menus through which the user would manually enter or select such information for transmission.

Others of the selections cause a new browser window to open on the user's computer, opening to a URL specified in data relayed from the MGA site but not displayed to the user in the menu. Appropriate HTML instructions can be generated to effect a particular query or other operation at the specified URL.

In some embodiments, the customized menu presents only a single choice in addition to those normally provided by the operating system, e.g., "Link to home." Clicking on this option opens a browser window to a home page at the MGA for that object. On that page, the user is presented with all of the foregoing options, and more (possibly including advertising graphics or multi-media). Such objects can serve as powerful marketing agents. Returning to the example discussed above, a JPG image file of a book cover may have, as its MGA, a web page hosted by a particular bookseller, providing purchase options and other information for that book. Marketing of books (or CDs, or cars, or consumer appliances, or virtually anything else) can be effected by disseminating such vendor-issued JPGs as widely as possible. Some book cover JPGs may be distributed by Amazon.com, others by Barnes&Noble.com, others by Borders.com—each pointing back to a different MGA through which purchase transactions for that book may be performed.

Returning to the MGA-customized menus, these needn't be limited to menus resulting from clicking on an icon or image (or signaling during an audio excerpt). Drop-down menus in application programs can likewise be populated with customized options, in accordance with customization data obtained from the MGA site for the object presently being accessed or used. Most graphical operating systems and application programs have well developed toolsets permitting such menu customization. Again, other data relayed from the MGA site is not shown to the user, but is employed by the computer (e.g., a browser program) to carry out menu options selected by the user.

Again the foregoing techniques are equally applicable for still images, audio, video, and other forms of content, and can readily be adapted for use both with general purpose computers, software applications, and specialized media appliances.

While, for expository convenience, the foregoing discussion contemplated embedding a literal URL address in the object as the MGA, more typically this is not the case. Instead, the MGA more commonly comprises identification data for the object (e.g. a 128-bit random ID), together with the URL for a name server computer that serves many (perhaps millions) of such objects (an example of the latter is the Digimarc MarcCentre server).

To obtain the desired data as detailed above, the user's computer (sometimes termed a client computer) links to the name server computer and provides the ID of the object being processed. The name server computer uses this ID to query a database, and obtains from the database the current IP address to which such queries should be routed. The name server computer can relay the request from the client computer to the correct destination address, or can return the correct destination address to the client computer, which can initiate such a link itself. By such arrangement, the IP address ultimately associated with an object can be easily changed as needed, simply by changing the corresponding record in the name server database, without rendering obsolete legacy objects having out-of-date addresses encoded therein.

In some embodiments, the URL of the name server needn't be included in the watermark. In the absence of a specified URL, the client computer may direct such links to a default name server address instead (stored locally or remotely). If that server doesn't recognize the object ID, it can return an error code, or pass the query on to other name servers. Those servers, in turn, can pass the query along to still other name servers if they don't recognize the object ID. In this fashion, an exponentially-large number of name servers might be quickly polled for information relating to the identified object. Alternatively, rather than encoding the complete IP address of the name server in an object watermark, the first N (e.g., 16) bits of the object ID might be used as a short-hand for one of 65,536 predetermined name server addresses, in accordance with data stored locally (e.g., on RAM or disk in the user's computer) or remotely (e.g., at a default name server IP address).

While the basic concept idea behind embedding MGA data within an object is to point to a repository of data about the object, a pointer the other way may be achieved as well.

As noted, the "ping" application of MGA data permits an MGA site to be informed of sites through which its object passes. More generally, the MGA site can log the originating address of each query it receives. Each such address can be presumed to have (or have had) a copy of the corresponding object. Media owners can thereby track the dissemination of copies of their media objects—at least insofar as use of such objects entails communicating with the associated MGA site.

Such tracking offers a great number of opportunities, some in the area of commerce. The MGA site corresponding to the cover art of a Garth Brooks CD, for example, can provide a listing of IP addresses of persons interested in that CD. Email or promotional data objects (e.g., audio clips) can be sent to that list of addresses when a subsequent Garth Brooks CD is released.

Such tracking also opens up a new dimension of internet searching. Presently, internet search engines use a brute force approach, visiting millions of pages across the web in order to identify, for example, a dozen instances of a given photograph file. MGAs offer a shortcut to such brute force approaches. With the present technology, a search engine can find a single instance of a photograph file and, by detection of the MGA data watermarked therein, link to the corresponding MGA site. From the MGA site, the search engine can obtain a listing (if such queries are authorized) of some or all of the other sites known by the MGA site to have copies of that photograph file. (Providing such data to search engines is a commerce opportunity for such MGA sites, which may permit such access to its listing of sites only in exchange for a fee. Or the MGA site may arrange to collect a tribute payment from the search engine proprietor each time the engine responds to a user query using data collected from the MGA site.)

Many of the addresses logged by the MGA may not be publicly-accessible data stores. The search engine can check each listed address to ensure that the desired object is present and accessible before adding the address to its database.

Covert Tracing application Ser. No. 09/185,380 (now U.S. Pat. No. 6,549,638) describes anti-counterfeiting technology that looks for the presence of digital data corresponding to bank note imagery in a computer system, and makes a covert record of any attempt to process such data (e.g., Scan, FileOpen, FileSave, Print, Edit, etc.). Such records are hidden from the user of the system (using, e.g., various data encryption and obscuring techniques), but authorized law enforcement officials are provided tools by which these records can be recovered. The forensic data thereby obtained may prove useful in prosecuting counterfeiters. (Knowledge that a computer may be covertly storing evidence of attempted counterfeiting actions may prove as, or more, valuable in deterring counterfeiting than the covert records themselves.)

The same techniques can be employed to deter unauthorized processing of audio, image, video, or content by media pirates. In one embodiment, a computer's operating system (including peripheral device drivers) monitors various data within the system (e.g., data sent to writeable storage media, or sent via a serial port or network connection, etc.) for data bearing a do-not-copy watermark. The presence of such data being sent, e.g., to a writeable disk or to a remote computer, indicates that the do-not-copy instruction has been circumvented. In such case, the operating system writes one or more covert records memorializing the activity, for possible use in criminal prosecution if the computer is lawfully seized.

The example just-provided is but one of many monitoring and response techniques that may be employed to deter circumvention of copy-protection or other access control systems. Generally speaking, if content data is found where it shouldn't be, or is found used as it shouldn't be used, a corresponding record should be made. (Other intervention actions can be triggered as well; covert tracing is desirably just one of several parallel responses to suspected hacking.)

Meta-Data Accessed Using Watermarks

Meta-data, in formats known as XML, SGML, and HTML, is widely used to communicate information about digital objects (e.g., author, keywords, price, rights, caption, etc.). More generally, meta-data can be thought of as any data construct which associates the name of a property (e.g., "author"), with the value of the property (e.g., "Mark Twain"). Such data commonly appears in a tag format, such as the following:

<META NAME="author" CONTENT="Mark Twain">

Meta-data is commonly exchanged between server and client computers in conjunction with the digital objects to which they relate (e.g., the text of a Mark Twain book).

As detailed herein, an important application of watermarking is likewise to convey information about media—in this case embedded within the media content itself (e.g., providing unique identification, establishing some basic behaviors such as do not copy, and providing links to extended functionality).

For meta-data to be useful, it must be linked to associated content, whether in the context of a browser, application program, operating system, asset management system, search engine, etc. However, as detailed below, the content and the associated meta-tags needn't always be conveyed together.

Consider an application program or other client process that receives a watermarked media object. The watermark includes an MGA for that object (which, as noted above, may not specify an ultimate IP address). Stored at the MGA site is meta-data corresponding to the object. By linking to the MGA site identified by the object's watermark, the client computer can obtain the meta-data corresponding to the object. This data can be stored at the client computer and used just as any other meta-data, e.g., to define the local functions that should be available for use with that object (e.g., buy, search, etc.)

A particular example is an on-line catalog of stock photography. Each photograph is watermarked with MGA data. To identify the photographer, copyright date, price, telephone number, subject, etc., an application program can link to the MGA site for that photograph, and obtain the corresponding meta-data. This data can then be displayed or used as needed. Data objects of disparate formats thus can readily be handled within a single, simple application program, since the program needn't concern itself with the varying formats for the associated meta-data (assuming the name servers provide this data in standardized format). Substantial flexibility in programming and object formatting is thereby achieved.

Returning to the internet search engine example described above, MGAs may become recognized as repositories rich in meta-data for media objects. Specialized search engines may focus their data collection around such sites, and be able to quickly identify the MGA sites corresponding to various boolean combinations of meta-tag parameters.

Asset Management/Containers

Much has been written on the topic of asset rights management. Sample patent documents include U.S. Pat. Nos. 5,892, 900, 5,715,403, 5,638,443, 5,634,012, 5,629,980 and laid-open European application EP 862,318. Much of the technical work is memorialized in journal articles, which can be identified by searching for relevant company names and trademarks such as IBM's Cryptolope system, Portland Software's ZipLock system, the Rights Exchange service by Softbank Net Solutions, and the DigiBox system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Desirably, the content should be marked (personalized/serialized) so that any illicit use of the content (after decryption) can be tracked. This marking can be performed with watermarking, which assures that the mark travels with the content wherever—and in whatever form—it may go. The watermarking can be effected by the distributor—prior to dissemination of the encrypted object—such as by encoding a UID that is associated in a database with that particular container. When access rights are granted to that container, the database record can be updated to reflect the purchaser, the purchase date, the rights granted, etc. An alternative is to include a watermark encoder in the software tool used to access (e.g. decrypt) the content. Such an encoder can embed watermark data in the content as it is released from the secure container, before it is provided to the user. The embedded data can include a UID. This UID can be assigned by the distributor prior to disseminating the container. Alternatively, the UID can be a data string not known or created until access rights have been granted. In addition to the UID, the watermark can include other data not known to the distributor, e.g. information specific to the time(s) and manner(s) of accessing the content.

As noted earlier, access rights systems can be realized with watermarks without containers etc. For example, in a trusting world, copyrighted works can be freely available on the web. If a user wishes to make lawful use of the work, the user can decode its watermark to determine the work's terms and conditions of use. This may entail linking to a web site specified by the embedded watermark (directly, or through an intermediate database), which specifies the desired information. The user can then arrange the necessary payment, and use the item knowing that the necessary rights have been secured.

Remote Reconfiguration of Watermark Detectors

In some cases, it is desirable to reconfigure watermark detectors remotely. Such functionality is desirable, for example, if a watermark system is hacked or otherwise compromised.

In accordance with this aspect, some aspect of a watermark detector's operation is changed in response to a command. The change can take various forms. In watermark systems employing pseudo-random key data (e.g., spread spectrum spreading signals), the pseudo-random signal used for detection can be changed. In systems using DFT processing, the mapping between message bits and DFT coefficients can be changed. In still other systems, the decoding can proceed as before, but the significance of one or more bits can be changed (e.g., bits that were normally interpreted as defining Field A can be interpreted as defining Field B, and vice versa). In yet other systems, the decoding can proceed as before, but the response of a device to a given watermark signal can be changed. In still other systems, a set of software instructions can be re-written or re-ordered to effect a change in detector operation.

The command can be conveyed in various ways. In one embodiment, it can be a trigger bit in the watermark payload. Normally the bit has a value of "0." If the bit has a value of "1," the detector system responds by changing its operation. A trigger pattern can also be established, so that detection of a certain combination of bits in the watermark payload serves to trigger the change. Reserved states of certain data fields are examples of patterns that might be employed.

The command can also be conveyed through another channel different than the watermark channel (e.g., an SCA channel of an FM broadcast, or the sub-titling data channel of video broadcasts, or header data within an MPEG data stream, etc., etc.).

The change can proceed in accordance with a pre-programmed rule (e.g., codes progressing successively through a numerically or algorithmically-determined progression), or the change can proceed in accordance with data specified elsewhere in the payload of the watermark bearing the trigger bit (e.g., instead of being interpreted in normal fashion, the non-trigger bits of the detected watermark can define a new pseudo-random key data. Or the change can proceed in accordance with data conveyed in successively-presented watermark payloads, as might be done in video encoding where each frame of video can convey further watermark information. (This latter arrangement is one offering a high-bandwidth re-programming channel through which, e.g., extensive firmware instructions might be transferred to the detector to replace instructions earlier stored.)

By such arrangements, greatly increased detector versatility and functionality can be achieved.

CONCLUSION

Many diverse embodiments are reviewed above—each with a unique set of features. This specification excerpts should be construed as explicitly teaching that features illustrated in one such embodiment can generally be used in other embodiments as well. Thus, for example, a date field was not particularly discussed in connection with payload data for video watermarking. Nor were "play once" watermarks so-considered. The inclusion of a calibration signal with (or as part of) the watermark is shown in embodiments of the issued patents, but is not belabored in the above-described embodiments. Likewise with "simple universal codes." The prestored commerce profile described in one of the foregoing embodiments is equally applicable to other embodiments as well. Likewise, the presentation of advertising was discussed in connection with one embodiment but not others, although it, too, is generally applicable. All of these concepts are familiar at Digimarc and are regarded as generally applicable throughout the work expressed in Digimarc's patent disclosures. Practicality prevents an exhaustive recitation of each individual permutation and combination.

Having described and illustrated the principles of our technology with reference to illustrative embodiments, it will be apparent that the detailed arrangements can be modified in arrangement and detail without departing from such principles.

For example, while reference has been made to various uses of wireless, it should be understood that such reference does not just cover FM broadcast, and wireless internet networking and the like, but also includes other wireless mechanisms. Examples include cell phones and direct satellite broadcast.

Likewise, while certain embodiments were illustrated with a watermark payload of 100+ bits, in other systems much smaller (or sometimes larger) payloads are desirable—sometimes as small as 1-8 bits.

While the foregoing examples have each been illustrated with reference to a particular media type (e.g., video, audio, etc.), it will be recognized that the principles of each embodiment find application with the other media types as well.

Certain of the appliances contemplated above require user interfaces more sophisticated than are presently typical on such devices. The simplicity of the underlying audio appliance can be preserved, in many instances, by using a palmtop computer—coupled by infrared or otherwise—as a temporary user interface to the appliance. Some of the processing capability can likewise be off-loaded to an ancillary palmtop. (Palmtop is here meant to refer generally to any pocket-size programmable computing device.) Unless otherwise stated, it should be understood that the digital music, video, and imagery contemplated herein is not of any particular form or format. Audio, for example, can be of various forms, both streaming and non-streaming, and of various formats (e.g. MP3, MP4, MS Audio, Windows Media Technologies, RealAudio, *.WAV, MIDI, Csound, Dolby's Advanced Audio Codec (AAC), etc.

In view of the many embodiments to which the principles of the subject technology can be applied, it should be apparent that the detailed embodiments are illustrative only and should not be taken as limiting. Rather, we claim all such modifications as may fall within the scope and spirit of the following claims, and equivalents thereto.

I claim:

1. A method comprising:
   receiving input from a first consumer, through a user interface of a computing device, wherein the input relates to particular content and identifies a destination device;
   deriving, using a processor, a content identifier from data representing human-perceptible attributes of the particular content; and
   sending the content identifier from the computing device to the destination device, wherein the content identifier is used by the destination device to request and receive content-related information.

2. The method of claim 1, wherein the destination device is associated with a second consumer, different than the first.

3. The method of claim 2, wherein the sending comprises sending data corresponding to the second consumer.

4. The method of claim 1, wherein the content identifier is used to receive from a remote system distinct from the computing device the content-related information.

5. The method of claim 1, further comprising deriving the content identifier by a digital watermark decoding operation.

6. The method of claim 1, further comprising deriving the content identifier by a fingerprint calculation.

7. The method of claim 1, wherein the content identifier comprises an object identifier by which both the content, and a distributor thereof, can be identified.

8. The method of claim 7, further comprising initiating a purchase transaction through the sending, and sharing with the distributor a part of proceeds from the purchase transaction.

9. A system comprising:
   a processor configured to:
      receive input from a first consumer related to particular content, wherein the input identifies a destination device;
      derive a content identifier from data representing human-perceptible attributes of the particular content; and
      send the content identifier to the destination device, wherein the content identifier is used by the destination device to request and receive content-related information.

10. The system of claim 9, wherein the destination device is associated with a second consumer, different than the first.

11. The system of claim 10, wherein the processor is further configured to send data corresponding to the second consumer.

12. The system of claim 9, wherein the processor is further configured to derive the content identifier by a digital watermark decoding operation.

13. The system of claim 9, wherein the processor is further configured to derive the content identifier by a fingerprint calculation.

14. The system of claim 9, wherein the content identifier comprises an object identifier by which both the content, and a distributor thereof, can be identified.

15. A non-transitory computer-readable medium having instructions stored thereon, the instructions comprising:
   instructions to receive input from a first consumer related to particular content, wherein the input identifies a destination device;
   instructions to derive a content identifier from data representing human-perceptible attributes of the particular content; and
   instructions to send the content identifier to the destination device, wherein the content identifier is used by the destination device to request and receive content-related information.

16. The non-transitory computer-readable medium of claim 15, wherein the destination device is associated with a second consumer, different than the first.

17. The non-transitory computer-readable medium of claim 16, further comprising instructions to send data corresponding to the second consumer.

18. The non-transitory computer-readable medium of claim 15, further comprising instructions to derive the content identifier by a digital watermark decoding operation.

19. The non-transitory computer-readable medium of claim 15, further comprising instructions to derive the content identifier by a fingerprint calculation.

20. The non-transitory computer-readable medium of claim 15, wherein the content identifier comprises an object identifier by which both the content, and a distributor thereof, can be identified.

* * * * *

UNITED STATES PATENT AND TRADEMARK OFFICE
CERTIFICATE OF CORRECTION

| | |
|---|---|
| PATENT NO. | : 8,126,200 B2 |
| APPLICATION NO. | : 12/506854 |
| DATED | : February 28, 2012 |
| INVENTOR(S) | : Rhoads |

It is certified that error appears in the above-identified patent and that said Letters Patent is hereby corrected as shown below:

Title page 3, item (56), under "Other Publications", in Column 2, Line 14, delete "Pocketpcfaq-dot-com," and insert -- Pocketpcfaq.com, --.

Signed and Sealed this
Fourth Day of September, 2012

David J. Kappos
*Director of the United States Patent and Trademark Office*